US010344652B2

(12) United States Patent
Englert et al.

(10) Patent No.: US 10,344,652 B2
(45) Date of Patent: Jul. 9, 2019

(54) ELECTRONIC PRESSURE RELIEF IN PUMPS

(71) Applicant: Cummins Emission Solutions Inc., Columbus, IN (US)

(72) Inventors: Tobias Englert, Bischbrunn (DE); Jens Honeck, Tauberbischofsheim (DE)

(73) Assignee: Cummins Emission Solutions Inc., Columbus, IN (US)

( * ) Notice: Subject to any disclaimer, the term of this patent is extended or adjusted under 35 U.S.C. 154(b) by 292 days.

(21) Appl. No.: 14/965,016

(22) Filed: Dec. 10, 2015

(65) Prior Publication Data

US 2017/0167340 A1 Jun. 15, 2017

(51) Int. Cl.
*F01N 3/20* (2006.01)

(52) U.S. Cl.
CPC .......... *F01N 3/208* (2013.01); *F01N 2390/02* (2013.01); *F01N 2610/02* (2013.01); *F01N 2610/144* (2013.01)

(58) Field of Classification Search
CPC . F01N 2390/02; F01N 2610/144; F01N 3/208
See application file for complete search history.

(56) References Cited

U.S. PATENT DOCUMENTS

| | | | |
|---|---|---|---|
| 6,209,315 B1 * | 4/2001 | Weigl | B01D 53/9431 60/274 |
| 8,774,972 B2 | 7/2014 | Rusnak et al. | |
| 8,812,202 B2 | 8/2014 | Yamamoto et al. | |
| 9,175,677 B2 * | 11/2015 | Habumuremyi | F01N 3/208 |
| 2013/0101439 A1 * | 4/2013 | Freudenberger | F04B 49/02 417/44.11 |
| 2014/0119966 A1 | 5/2014 | Stavale et al. | |
| 2017/0152798 A1 * | 6/2017 | Casetti | F02D 41/003 |

FOREIGN PATENT DOCUMENTS

JP 2015081545 A * 4/2015

* cited by examiner

*Primary Examiner* — Audrey K Bradley
*Assistant Examiner* — Anthony Ayala Delgado
(74) *Attorney, Agent, or Firm* — Foley & Lardner LLP

(57) ABSTRACT

An aftertreatment system comprises a reductant storage tank and a selective catalytic reduction (SCR) system including a catalyst for reducing constituents of an exhaust gas. A reductant insertion assembly including a pump and dosing valve is fluidly coupled to the pump and the SCR system. A controller is communicatively coupled to the reductant insertion assembly. The controller is configured to initialize the pump so as to pressurize a reductant in the pump. The dosing valve is opened, thereby expelling the reductant into the SCR system. An operating electrical parameter value of the pump is determined which is indicative of an operating pressure of the pump. The controller determines if the operating electrical parameter value exceeds a predetermined operating threshold. If the operating electrical parameter value exceeds the predetermined operating threshold, the controller stops the pump.

20 Claims, 19 Drawing Sheets

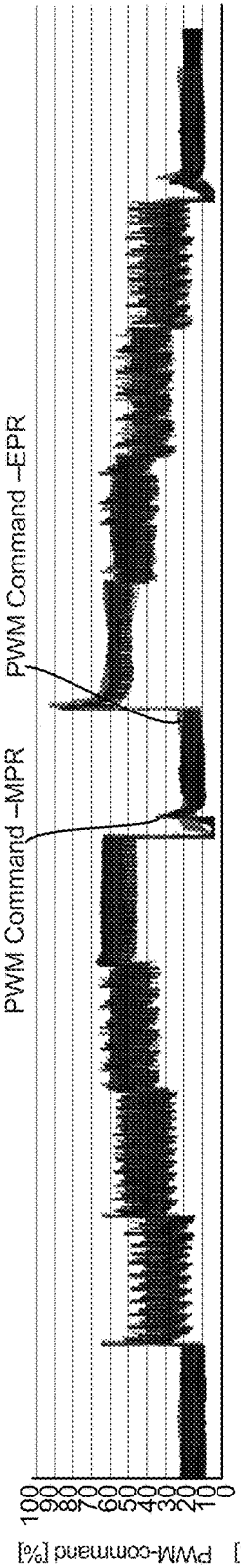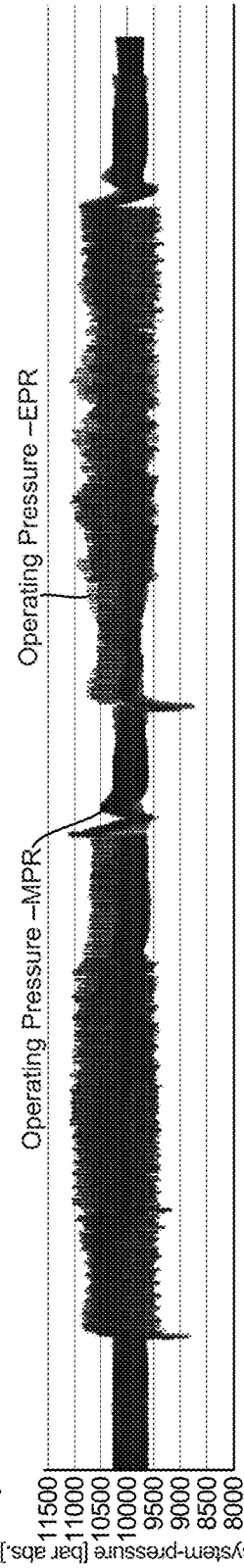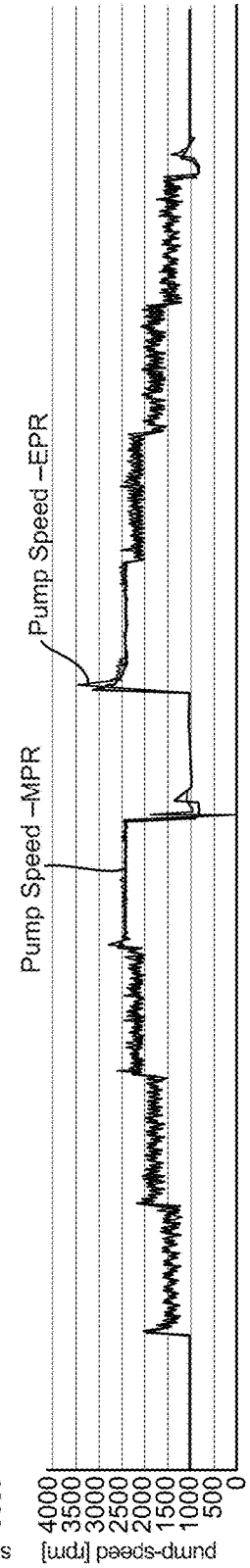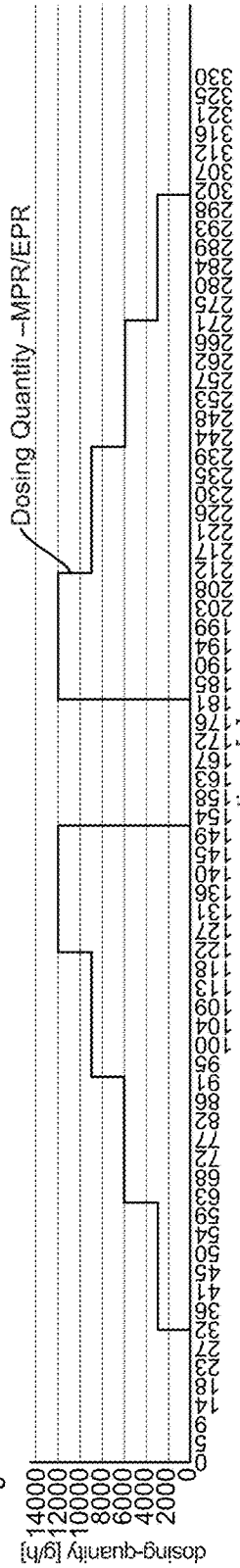
FIG. 14

ELECTRONIC PRESSURE RELIEF IN PUMPS

TECHNICAL FIELD

The present disclosure relates generally to aftertreatment systems for use with internal combustion (IC) engines.

BACKGROUND

Exhaust aftertreatment systems are used to receive and treat exhaust gas generated by IC engines. Generally exhaust gas aftertreatment systems include any of several different components to reduce the levels of harmful exhaust emissions present in exhaust gas. For example, certain exhaust gas aftertreatment systems for diesel-powered IC engines include a selective catalytic reduction (SCR) system including a catalyst formulated to convert NOx (NO and $NO_2$ in some fraction) into harmless nitrogen gas ($N_2$) and water vapor ($H_2O$) in the presence of ammonia ($NH_3$). Generally in such aftertreatment systems, an exhaust reductant, (e.g., a diesel exhaust fluid such as urea) is injected into the SCR system to provide a source of ammonia, and mixed with the exhaust gas to partially reduce the NOx gases. The reduction byproducts of the exhaust gas are then fluidically communicated to the catalyst included in the SCR system to decompose substantially all of the NOx gases into relatively harmless byproducts which are expelled out of the aftertreatment system.

An exhaust reductant is generally inserted into the SCR system as the source of ammonia to facilitate the reduction of constituents such as NOx gases of the exhaust gas (e.g., a diesel exhaust gas). Pumps are often used to insert the reductant into the SCR system. Generally such pumps include mechanical pressure relieve valves which passively activate to relieve pressure and prevent excessive pressure buildup in the pump. Pressure relief valves often malfunction or fail and have to be replaced, which significantly adds to the maintenance cost of such systems.

SUMMARY

Embodiments described herein relate generally to systems and methods for preventing excessive buildup in pumps, and in particular to using an operating electrical parameter value of the pump as a proxy for an operating pressure of the pump and stopping the pump if the operating electrical parameter value exceeds an operating threshold. Embodiments of the systems and methods described herein are configured to prevent the operating pressure of the pump from exceeding the operating threshold so that a pressure relief valve can be excluded from the pump.

In a first set of embodiments, an aftertreatment system comprises a SCR system including a catalyst for reducing constituents of an exhaust gas. The aftertreatment system also includes a reductant storage tank. A reductant insertion assembly is fluidly coupled to the reductant storage tank and the SCR system. The reductant insertion assembly comprises a pump and a dosing valve fluidly coupled to the pump. A controller is communicatively coupled to the reductant insertion assembly. The controller is configured to initialize the pump so as to pressurize a reductant in the pump. The controller opens the dosing valve, thereby inserting the reductant into the SCR system. The controller determines an operating electrical parameter value of the pump. The operating electrical parameter is indicative of an operating pressure of the pump. The controller determines if the operating electrical parameter value exceeds a predetermined operating threshold. In response to the operating electrical parameter value exceeding the operating threshold, the controller stops the pump.

In a second set of embodiments, a reductant insertion assembly comprises a pump and a dosing valve fluidly coupled to the pump. A sensing circuitry is configured to sense one or more electrical parameters of the pump. A controller is communicatively coupled to the pump and the sensing circuitry. The controller is configured to initialize the pump so as to pressurize a reductant in the pump. The controller opens the dosing valve, thereby expelling a reductant therethrough. The controller determines an operating electrical parameter value of the pump via the sensing circuitry. The operating electrical parameter value is indicative of an operating pressure of the pump. The controller determines if the operating electrical parameter value exceeds a predetermined operating threshold. In response to the operating electrical parameter value exceeding the operating threshold, the controller stops the pump.

In a third set of embodiments, a method of operating a reductant insertion assembly comprising a pump and a dosing valve structured to be fluidly coupled to an aftertreatment system, comprises initializing the pump so as to pressurize a reductant in the pump to an operating pressure of the pump. The dosing valve is opened, thereby inserting a reductant into the aftertreatment system. It is determined if an operating electrical parameter value exceeds a predetermined operating threshold of the pump. The operating electrical parameter value is indicative of the operating pressure of the pump. In response to the operating electrical parameter value exceeding the operating threshold, the pump is stopped.

In a fourth set of embodiments, a control circuitry comprises a controller configured to be communicatively coupled to a reductant insertion assembly which includes a pump, a dosing valve fluidly coupled to the pump and a sensing circuitry. The controller comprises a torque adjusting circuitry, a dosing control circuitry and a pressure determining circuitry. The torque adjusting circuity is configured to initialize the pump so as to pressurize a reductant in the pump. The dosing control circuitry is configured to open the dosing valve, thereby expelling a reductant therethrough. The pressure determining circuitry is configured to determine an operating pressure of the pump via an operating electrical parameter value of the pump provided by the sensing circuitry. The operating electrical parameter is indicative of an operating pressure of the pump. The pressure determining circuitry is also configured to determine if the operating electrical parameter value exceeds a predetermined operating threshold. The torque adjusting circuitry is configured to, in response to the operating electrical parameter value exceeding the operating threshold, stop the pump.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIGS. 5-16 are various plots showing performance (pump speed or pressure vs time) of a first pump (Pump 1) which provides pressure relief using a pressure relief valve and a second pump (Pump 2) which is operated according to the systems and methods described herein.

Figure 1:
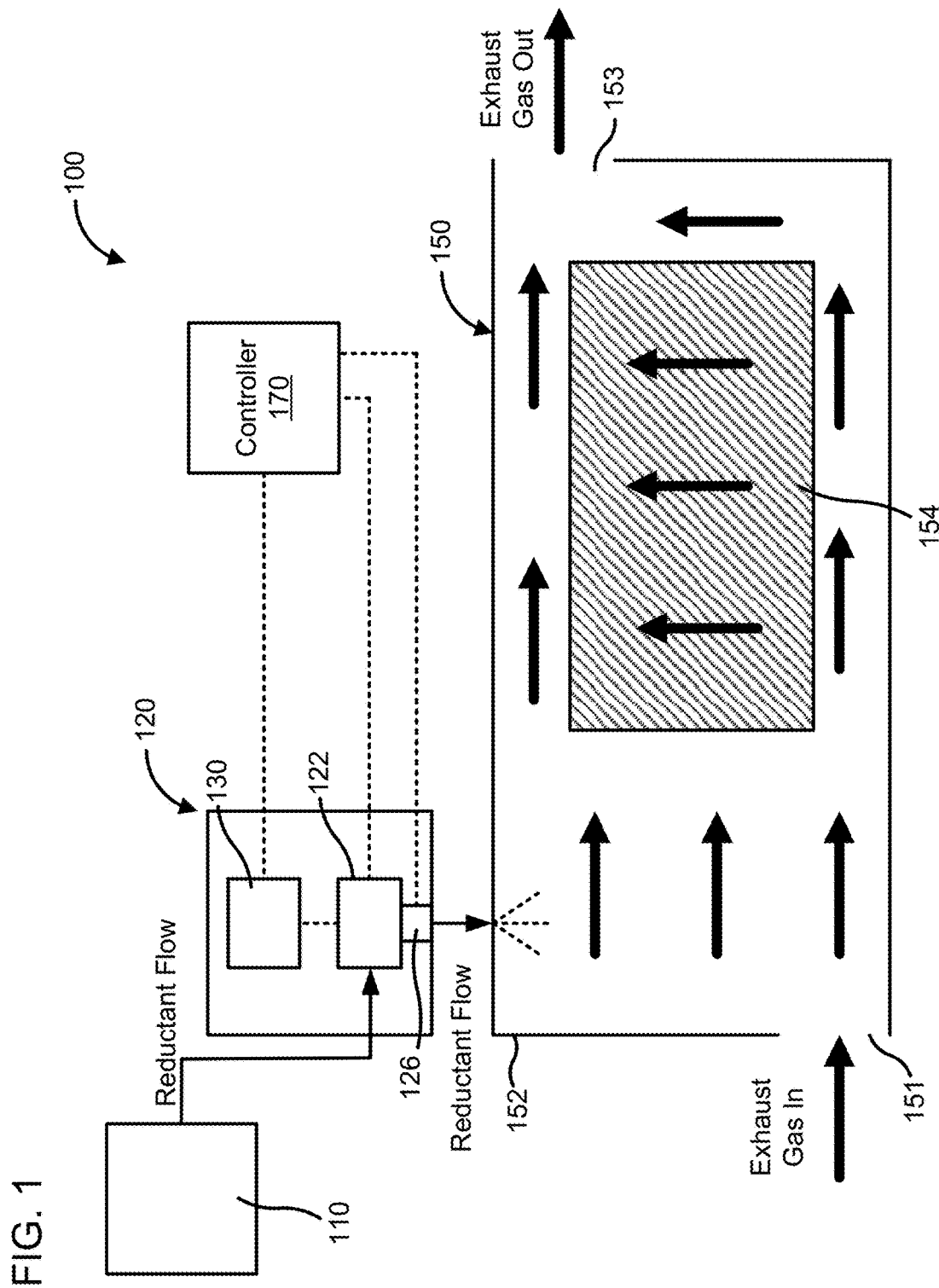
FIG. 1 is a schematic illustration of an aftertreatment system, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to systems and methods for preventing excessive buildup in pumps, and in particular to using an operating electrical parameter value of the pump as a proxy for an operating pressure of the pump and stopping the pump if the operating electrical parameter value exceeds an operating threshold. Embodiments of the systems and methods described herein are configured to prevent the operating pressure of the pump from exceeding the operating threshold so that a pressure relief valve can be excluded from the pump.

Reductant insertion assemblies are used to inject or otherwise insert a reductant into an aftertreatment component, for example an SCR system included in the aftertreatment system. Generally, reductant insertion assemblies include a pump structured to pressurize the reductant to a predetermined operating pressure or otherwise pressure range for inserting into the aftertreatment system. To prevent the pump from exceeding the predetermined operating pressure or over pressurizing the reductant, the pump or the reductant insertion assembly generally includes a mechanical pressure relief valve structured to provide pressure relief. For example, if the pressure exceeds a pressure threshold of the pump, the pressure relief valve opens to allow at least a portion of the reductant to be expelled from the pump through the valve, for example returned to a reductant storage tank. Such mechanical pressure relief valves are prone to clogging and malfunction, for example due to dust, contaminants, or solidification of reductant in the valve. This can significantly increase the maintenance frequency and maintenance cost of the pump.

Various embodiments of the systems and methods described herein for preventing pressure of a pump included in a reductant insertion assembly from exceeding a pressure threshold without using a pressure relief valve may provide benefits including, for example: (1) providing real time control of pressure provided by pump using current consumed by the pump as proxy for the pressure; (2) preventing pressure of the pump from exceeding a predetermined pressure threshold electronically obviating the use of a mechanical pressure relief valve; and (3) providing reductions in manufacturing and maintenance cost by allowing exclusion of the pressure relief valve.

FIG. 1 is a schematic illustration of an aftertreatment system 100, according to an embodiment. The aftertreatment system 100 is configured to receive an exhaust gas (e.g., a diesel exhaust gas) from an engine (e.g., a diesel engine) and reduce constituents of the exhaust gas such as, for example, NOx gases, CO, etc. The aftertreatment system 100 includes a reductant storage tank 110 (also referred to herein as "tank 110"), a reductant insertion assembly 120, a SCR system 150 and a controller 170.

The tank 110 contains an exhaust reductant formulated to facilitate reduction of the constituents of the exhaust gas (e.g., NOx) by a catalyst 154 included in the SCR system 150. In embodiments in which the exhaust gas is a diesel exhaust gas, the exhaust reductant can include a diesel exhaust fluid (DEF) which provides a source of ammonia. Suitable DEFs can include urea, an aqueous solution of urea or any other DEF (e.g., the DEF available under the tradename ADBLUE®).

The SCR system 150 is configured to receive and treat the exhaust gas (e.g., a diesel exhaust gas) flowing through the SCR system 150. The SCR system 150 is fluidly coupled to the tank 110 to receive the reductant from the tank 110 via the reductant insertion assembly 120, as described herein. The SCR system 150 includes a housing 152 defining an inlet 151 for receiving the exhaust gas from an engine (e.g., a diesel IC engine), and an outlet 153 for expelling treated exhaust gas. The SCR system 150 includes at least one catalyst 154 positioned within an internal volume defined by the housing 152. The catalyst 154 is formulated to selectively reduce constituents of the exhaust gas, for example NOx included in the exhaust gas in the presence of an exhaust reductant. Any suitable catalyst 154 can be used such as, for example, platinum, palladium, rhodium, cerium, iron, manganese, copper, vanadium based catalysts (including combinations thereof).

The catalyst 154 can be disposed on a suitable substrate such as, for example, a ceramic (e.g., cordierite) or metallic (e.g., kanthal) monolith core which can, for example, define a honeycomb structure. A washcoat can also be used as a carrier material for the catalyst 154. Such washcoat materials can include, for example, aluminum oxide, titanium dioxide, silicon dioxide, any other suitable washcoat material, or a combination thereof. The exhaust gas flows over and about the catalyst 154 such that NOx gases included in the exhaust gas are further reduced to yield an exhaust gas which is substantially free of carbon monoxide and NOx gases.

The reductant insertion assembly 120 is fluidly coupled to the tank 110 and the SCR system 150 and is configured to insert the reductant into the SCR system 150 from the tank 110. The reductant insertion assembly 120 includes a pump 122 fluidly coupled to the tank 110 and a dosing valve 126. The pump 122 can include any suitable pump, for example a centrifugal pump, a rotary pump, vacuum pump, a plate pump, a diaphragm or membrane pump or any other suitable pump. In particular embodiments, the pump 122 includes a membrane pump or a diaphragm pump.

In various embodiments, the pump includes a motor (e.g., the motor 224 shown in FIG. 3) to drive the pump 122. For example, the pump 122 can include a diaphragm pump or membrane pump, and the motor can be operatively coupled to diaphragm to drive the diaphragm for pumping the fluid. The torque exerted by the motor on the diaphragm or otherwise the torque produced by the pump 122 corresponds to an operating pressure of the pump 122, i.e., the pressure to which the reductant is pressurized by the pump 122. The motor can be operated using any suitable operating signal, for example a voltage in the range of 10 Volts to 32 Volts (e.g., 10, 12, 14, 16, 18, 20, 22, 24, 26, 28, 30 or 32 Volts inclusive of all ranges and values therebetween), a current, a pulse width modulated (PWM) signal/command or any other suitable operating signal.

Furthermore, the torque produced by the pump 122 corresponds proportionally to an operating electrical parameter value of the motor or otherwise the pump 122. For example, the operating electrical parameter value can include a current consumed by the pump 122 or otherwise the motor of the pump 122. Since the torque produced by the pump 122 corresponds to the operating pressure of the pump 122 and also to the operating electrical parameter value, the operating electrical parameter value is indicative of the operating pressure of the pump 122.

The operating electrical parameter value can therefore, be used to determine the operating pressure of the pump 122 and prevent the operating pressure from exceeding a predetermined operating threshold. For example, the operating threshold can include a threshold current value corresponding to a threshold pressure value of the pump 122. In various embodiments, the threshold pressure value of the pump 122 can be in the range of 13,000 to 20,000 mbar (e.g., 13,000, 14,200, 15,400, 16,600, 17,800 or 20,000 mbar inclusive of all ranges and values therebetween). In some embodiments, the threshold pressure value of the pump 122 can be based on an operating pressure of the SCR system 150 and may be set slightly above the operating pressure of the SCR system 150.

In various embodiments, the operating threshold can be a variable which depends on one or more parameters of the pump 122. For example, the operating threshold can depend on a value of the operating signal provided to the pump 122. In particular embodiments, the operating signal can include an operating voltage used to operate the pump 122. For example, pumps from different manufacturers can be rated at different operating voltages, or the operating voltage of the pump varies based on an operational state of an engine fluidly coupled to the aftertreatment system 100 (e.g., operate pump at lower voltages when engine is under low load or idle conditions and operate pump at higher voltages during high load or acceleration conditions of the engine). In some embodiments operating voltage can be in the range of 10 Volts to 32 Volts (e.g., 10, 12, 14, 16, 18, 20, 22, 24, 26, 27, 28, 29, 30, 31 or 32 Volts inclusive of all ranges and values therebetween). Other parameters set by manufacturers of the pump can also be used for the operating threshold, or the parameters/threshold values could be set independent of manufacturer settings. In other embodiments, the operating signal can include a current, a PWM signal or comments or any other operating signal and operating threshold can depend thereon.

The operating threshold can also depend on an operating temperature of the pump 122. For example, high temperatures can cause the pump 122 and/or a fluid (e.g., a reductant) pumped by the pump 122 to heat up and become less dense. The lesser density may reduce the torque applied by the pump 122 to pump a predetermined mass or volume of the reductant. In contrast, the cold temperatures can result in an increase in the density of the fluid so that a higher torque is used by the pump 122 to pump the same predetermined mass or volume of the fluid. In various embodiments, the value of the operating threshold is adjusted to account for variations in the operating temperature in the range of −40 degrees Celsius to 80 degrees Celsius (e.g., −40, −30, −20, −10, 0, 10, 20, 30, 40, 50, 60, 70 or 80 degrees Celsius inclusive of all ranges and values therebetween).

The pump 122 is structured to receive the reductant from the tank 110 and pressurize the reductant to an operating pressure of the pump 122. For example, a pumping reservoir (not shown) can be positioned downstream of the pump 122 and upstream of the dosing valve 126. The pump 122 can continue to pump the reductant into the pumping reservoir and increase the pressure of the pump to the operating pressure.

The dosing valve 126 is selectively opened to allow the reductant pressurized by the pump 122 to be inserted into the SCR system 150. The dosing valve 126 can include any suitable valve, for example, a butterfly valve, a plate valve, a pressure activated valve, an air activated valve (e.g., an air injector) or any other suitable valve. The dosing valve 126 can include a nozzle (not shown) fluidly coupled to the SCR system 150 to insert the reductant therein. In various embodiments, the dosing valve 126 or the nozzle included in the dosing valve 126 can be fluidly coupled to a mixer (not shown) positioned upstream of the SCR system 150. The reductant is inserted upstream of the SCR system 150 to increase residence time of the reductant with the exhaust gas flowing through the aftertreatment system 100, thereby enhancing mixing of the reductant with the exhaust gas before entering the SCR system 150. In one embodiment, the dosing valve 126 includes a solenoid, a valve needle seated in a valve seat and a nozzle. In such embodiments, activating the dosing valve 126 includes activating the solenoid so as to move the valve needle distal from the valve seat so that the reductant can be pumped through the nozzle.

The reductant insertion assembly 120 also includes a sensing circuitry 130 communicatively coupled to the pump 122 and configured to sense the operating electrical parameter value of the pump 122 and/or determine an operating pressure of the pump 122 therefrom. For example, the sensing circuitry 130 can be structured to measure a current consumed by the pump 122 or otherwise a motor of the pump 122 which is indicative of the operating pressure of the pump 122. The sensing circuitry 130 can include sensors, processors, resistors, capacitors and memory storing lookup tables, algorithms or otherwise instructions to determine the operating electrical parameter value of the pump 122.

The sensing circuitry 130 can also be coupled to the controller 170 and structured to provide output signals or output data corresponding to the operating electrical parameter value to the controller 170. In various embodiments, the sensing circuitry 130 can be communicatively coupled to the controller 170 in a feedback loop so as to receive input signals or input data for controlling an operating signal (e.g., a voltage) provided to the pump 122.

Figure 3:
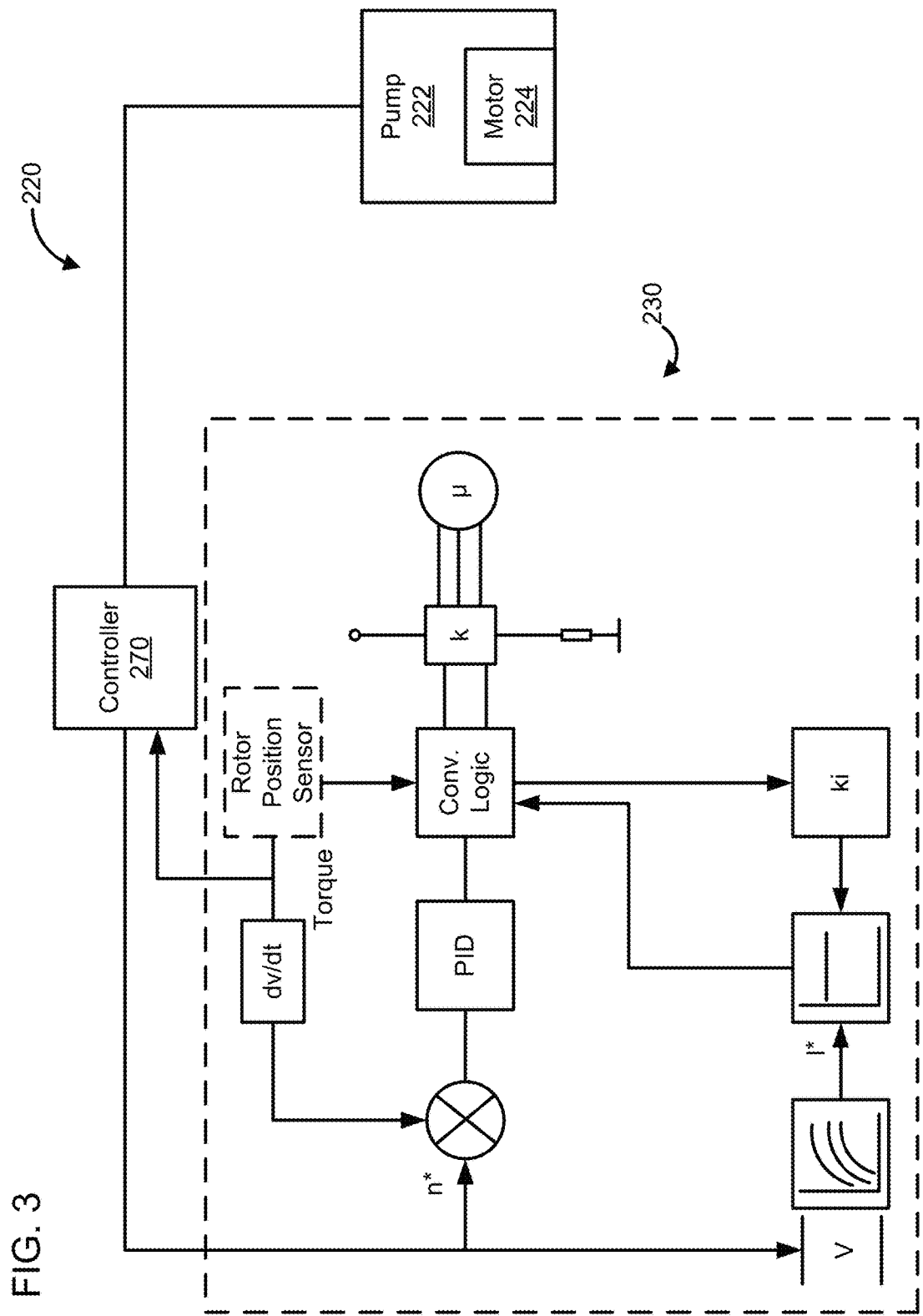
FIG. 3 is a schematic block diagram of still another embodiment of a sensing circuitry of a reductant insertion assembly included in the aftertreatment system of FIG. 1.

FIG. 3 is a circuit diagram of a particular embodiment of a sensing circuitry 230 that is included in a reductant insertion assembly 220. The reductant insertion assembly 220 also includes a pump 222 including a motor 224. The pump 222 can include any suitable pump, for example the pump 122 as described herein. The reductant insertion assembly 220 can be included in the aftertreatment system 100 or any other aftertreatment system described herein. The sensing circuitry 230 is communicatively coupled to the controller 270, which can be substantially similar to the controller 170 described herein in detail.

The sensing circuitry 230 may optionally include a rotor position sensor (e.g., a hall effect sensor) and an acceleration sensor (dv/dt) which are used to determine a torque generated by the motor 224 of the pump. In some embodiments, the controller 270 can be configured to determine the rotor position (i.e., position of a rotor of the motor 224) using a back electromotive force (EMF or otherwise voltage) signal generated by the motor. In such embodiments, the rotor position sensor may be excluded which provides significant cost savings.

The sensing circuitry includes a proportional-integral-derivative (PID) controller or any other processor and a memory ("conversion logic") which includes a non-transitory computer readable medium storing instructions to convert the torque information into current (I) consumed by the motor 224. The sensing circuitry 230 also includes a filter "μ" (e.g., a low pass filter, a high pass filter, a band pass filter or any other suitable filter), and one or more resistors "k".

The sensing circuitry 230 determines the operating electrical parameter value which, in some embodiments, can include an operating current I. The operating electrical parameter value is communicated to the controller 270. The sensing circuitry 230 is in a feedback loop with the controller 270 and is configured to provide an operating signal, for example an input voltage (V) or, an input current, a PWM signal or any other suitable input signal to the motor 224 of the pump 222 to operate the pump 222. The controller 270 compares the operating current I with a predetermine operating threshold current (I*).

As described before, the controller 270 varies the value of the operating threshold based on the input voltage V (or any other input signal) and commutations thereof which can be different for different pump 222 speeds. If the operating current I exceeds the threshold current I*, the controller 270 commands the sensing circuitry 230 to limit the provided input voltage V based on a maximum adjusted/predetermined operating threshold to stop providing the input voltage V to the pump 222 or otherwise the motor 224 of the pump 222, thereby stopping the pump. In some embodiments, the pump 222 may be stopped once the operating current I exceeds the threshold current I*. In this manner, dynamic control of the operating pressure of the pump 222 is provided so that the operating pressure of the pump 222 never exceeds an operating pressure threshold (e.g., a maximum rated pressure of the pump 222). Thus, passive pressure relief from excessive pressure buildup is not needed for the pump 222. Therefore, the reductant insertion assembly 220 does not include a pressure relief valve.

Figure 2:
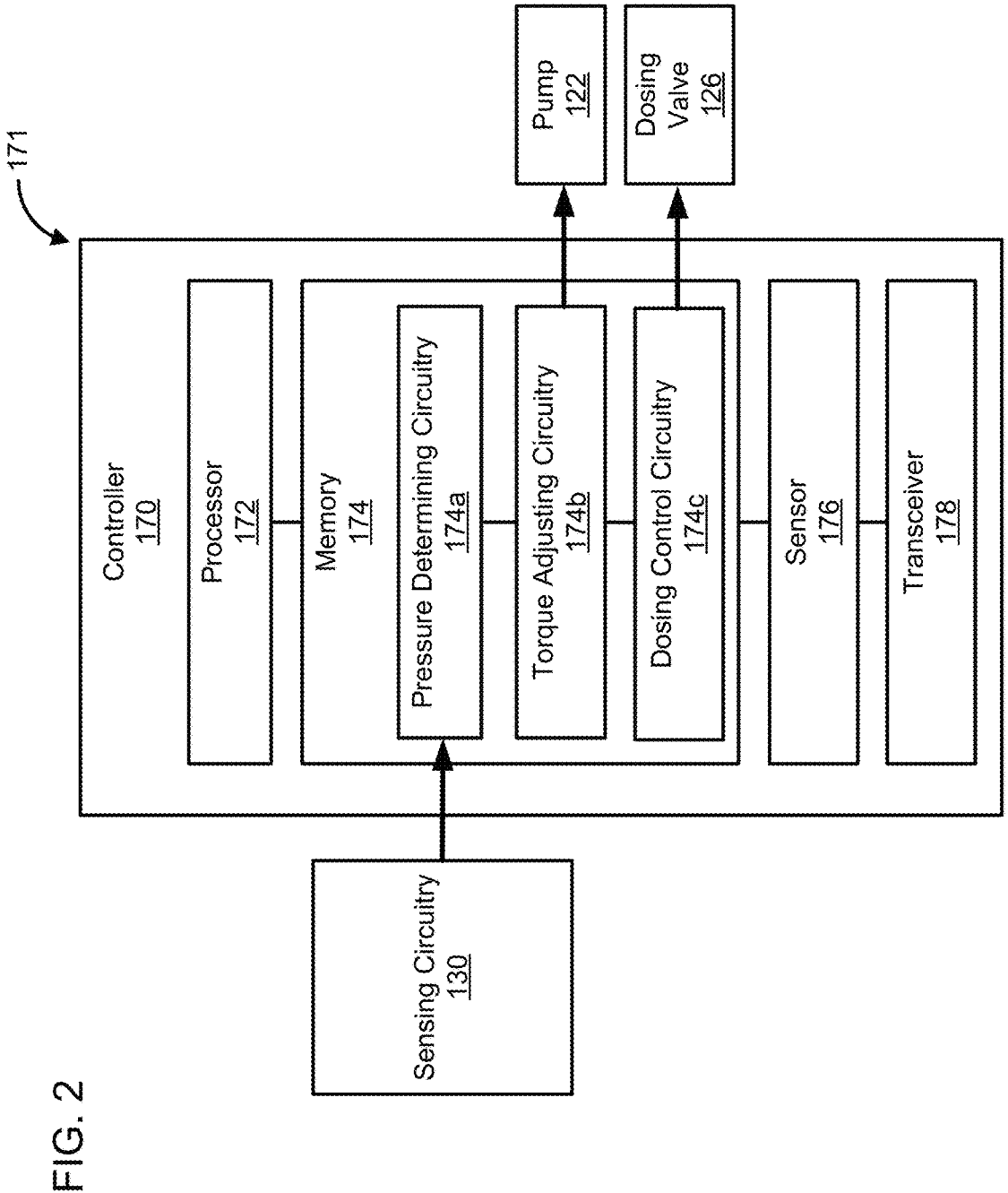
FIG. 2 is schematic block diagram of another embodiment of a control circuitry that can include the controller included in FIG. 1.

Referring again to FIG. 1, the controller 170 is communicatively coupled to the reductant insertion assembly 120. Specifically, the controller 170 is communicatively coupled to each of the pump 122, the dosing valve 126 and the sensing circuitry 130 (e.g., the sensing circuitry 230 shown in FIG. 3) included in the reductant insertion assembly 120. FIG. 2 is a schematic block diagram of an embodiment of a control circuitry 171 which can include the controller 170. The controller 170 may include a processor 172, a memory 174 or other computer readable medium, a transceiver 178, and optionally a sensor 176. It should be understood that the control circuitry 171 shows only one embodiment of a control circuitry and any other controller capable of performing the operations described herein can be used (e.g., the computing device 630).

The processor 172 can include a microprocessor, programmable logic controller (PLC) chip, an ASIC chip, or any other suitable processor. The processor 172 is in communication with the memory 174 and configured to execute instructions, algorithms, commands or otherwise programs stored in the memory 174.

The memory 174 includes any of the memory and/or storage components discussed herein. For example, memory 174 may include RAM and/or cache of processor 172. The memory 174 may also include one or more storage devices (e.g., hard drives, flash drives, computer readable media, etc.) either local or remote to device controller 170. The memory 174 is configured to store look up tables, algorithms or instructions.

For example, the memory 174 includes a pressure determining circuitry 174a configured to store instructions for determining an operating pressure of the pump from the operating electrical parameter value of the pump provided by the sensing circuitry 130. For example, the sensor 176 can be configured to receive an input signal (e.g., a current or a voltage) corresponding to the operating electrical parameter value of the pump 122 and communicate the input signal to the pressure determining circuitry 174a for determine the operating pressure of the pump 112.

The pressure determining circuitry 174a also includes instructions to adjust a value of the operating threshold based on a value of an operating signal of the pump 122 (e.g., a voltage in the range of 10 Volts to 32 Volts) and/or an operating temperature of the pump (e.g., in the range of −40 to 80 degrees Celsius). The pressure determining circuitry 174a also receives the operating electrical parameter value, for example, from the sensing circuitry 130, for example via the sensor 176, from the sensing circuitry 130 and compares the operating electrical parameter value (e.g., a current consumed by the motor 224 of the pump 222) with the operating threshold (e.g., a threshold current value corresponding to a threshold pressure value of the pump) to determine if the pump 122 is exceeding the operating threshold of the pump 122.

The memory 174 also includes a torque adjusting circuitry 174b configured to provide an operating signal to the pump to start the pump 122, stop the pump 122, and/or control a torque generated by the pump 122 (e.g., a motor included in the pump 122). For example, the pressure determining circuitry 174a can provide information to the torque adjusting circuitry 174b on whether the operating electrical parameter value or otherwise operating pressure value of the pump 122 is within or exceeding the operating threshold. Based on this information, the torque adjusting circuitry 174b can control the torque of the pump 122, for example by controlling a value of an operating signal (e.g., and operating voltage provided to the pump 122) or stop the pump 122.

In some embodiments, the transceiver 178 can be configured to generate the operating signal to adjust the torque generated by the pump 124. In other embodiments, the torque adjusting circuitry 174b can instruct the sensing circuitry 130, which can be in a feedback loop with the controller 170, to adjust the operating signal provided to the pump 122 for controlling the torque generated by the pump 122. The memory 174 also includes a dosing control circuitry 174c configured to selectively activate the dosing valve 126, for example via the transceiver 178. The dosing control circuitry 174c can include algorithms or lookup tables to determine an insertion rate and/or insertion frequency of the reductant into the SCR system 150, for example based on one or more operating conditions of an engine (e.g., a diesel engine) fluidly coupled to the aftertreatment system 100, an exhaust gas temperature, an exhaust gas pressure or any other operating parameter.

In operation, the controller 170 is configured to initialize the pump 122 so as to pressurize a reductant in the pump 122. For example, the torque adjusting circuitry 174b can instruct the sensing circuitry 130 to initialize the pump 122 by providing an operating signal (e.g., an operating voltage having a value in the range of 10 to 32 Volts, an operating current or PWM signal) to the pump 122. The operating voltage can correspond to an operating pressure at which the reductant is to be inserted into the SCR system 150.

The controller 170 opens the dosing valve 126, thereby inserting the reductant into the SCR system 150. The controller 170 is configured to determine the operating electrical parameter value of the pump 122. For example, the pressure determining circuitry 174a determines the operating electrical parameter value of the pump 122 (e.g., a current consumed by the motor of the pump 122) which is indicative of the operating pressure of the pump 122 as described herein.

The controller 170 determines if the operating electrical parameter value exceeds a predetermined threshold. For example, the pressure determining circuitry 174a determines if the operating electrical parameter value (e.g., a current consumed by the motor of the pump 122) exceeds the predetermined threshold (e.g., a threshold current corresponding to a threshold pressure value of the pump 122).

If the operating electrical parameter value exceeds the predetermined threshold, the controller 170 stops the pump 122. For example, the torque adjusting circuitry 174b commands the sensing circuitry 130 to stop the pump. Expanding further, in certain instances the pump 122 can continuously pressurize the reductant so that the operating pressure of the pump 122 continues to build. However, the dosing valve 126 may remain closed or an interval between opening of the dosing valve can be such that the pressure relief provided by the dosing valve 126 is not frequent enough or a length of time the dosing valve 126 remains open is not sufficient enough to dissipate the pressure buildup in the pump 122. In this scenario, the operating pressure of the pump 122 can continue to increase and may exceed the operating pressure value.

In such instances, the controller 170 stops the pump 122 to prevent any further pressure buildup. Furthermore, the controller 170 can be configured to activate the dosing valve 126 while the pump 122 is stopped. For example, while the pump 122 is stopped, the dosing control circuitry 174c can continue to open the dosing valve 126 to insert the reductant into the SCR system 150 to meet a reductant demand based on the one or more operating parameters or operating conditions of the exhaust gas flowing through the aftertreatment system 100. The continued insertion of the reductant into the SCR system 150 even when the pump 122 is stopped reduces the pressure on the pump thereby reducing the operating pressure below the threshold pressure value of the pump 122.

In this manner, any overpressure or pressure buildup in the pump 122 is relieved without using a pressure relief valve. Once the pressure drops below the operating pressure threshold value which is indicated by the operating electrical parameter value falling below the predetermined operating threshold, the controller 170 can restart the pump 122.

The controller 170 can also be configured to prevent excessive pressure buildup in the pump 122 when the pump 122 is initialized. Since there is no pressure relief valve included in the pump 122 or the reductant insertion assembly 120, the reductant present in the pump 122 from a previous operation might still be pressurized at an initial operating pressure of the pump 122 even when the reductant insertion assembly 120 and the pump 122 were shut down after the previous operation cycle. When the pump 122 is initialized again, for example at the beginning of a new operation cycle, the initial operating pressure of the pump 122 may exceed a predetermined initial threshold above which the pump 122 can, for example be damaged.

In various embodiments, the controller 170 is further configured to determine an initial electrical parameter value of the pump 122 on initializing the pump 122. The initial electrical parameter value is indicative of an initial pressure of the pump 122 i.e., the pressure of the pump 122 when the pump is first started. As described before, the initial electrical parameter value can include a current consumed by the motor of the pump 122. The controller 170 determines if the initial electrical parameter value exceeds a predetermined initial threshold. For example, the pressure determining circuitry 174a can be configured to determine if the initial electrical parameter value exceeds the predetermined initial threshold.

The predetermined initial threshold can include an initial threshold current value corresponding to an initial threshold pressure value of the pump 122. In particular embodiments, the initial threshold includes an initial threshold pressure value of the pump 122. In such embodiments, the controller 170 (e.g. the pressure determining circuitry 174a) is configured to determine an initial operating pressure value of the pump 122 from the initial electrical parameter value. The controller 170 determines if the initial operating pressure value exceeds the threshold initial pressure. Similar to the predetermined operating threshold, the controller 170 can also be configured to adjust a value of the initial threshold based on a value of an operating signal of the pump (e.g., an operating voltage in the range of 10 Volts to 32 Volts) and/or an operating temperature of the pump (e.g., in the range of −40 to 80 degrees Celsius).

If the initial electrical parameter value exceeds the initial threshold, the controller 170 stops the pump 122. This prevents the initial pressure from increasing any further beyond the initial threshold. The controller 170 may instruct the dosing valve 126 to open to insert at least a portion of the pressurized reductant already present in the pump 122 into the SCR system 150 while the pump 122 is stopped. This releases the pressure on the pump 122 so that the initial operating pressure and, thereby the initial electrical parameter value of the pump 122 drops below the initial threshold. In various embodiments, the initial threshold is adjusted so as to allow the pump 122 to initialize only against a non-pressurized reductant insertion assembly, for example when an operating pressure on a discharge side of the pump 122 is zero or close to zero (e.g., within +10%) on pump 122 startup.

In some embodiments, the reductant insertion assembly 120 may also include a return line (not shown) fluidly coupling the reductant insertion assembly 120 to the tank 110. The return line may be used to prevent excessive pressure buildup and/or relieve pressure from the reductant insertion assembly 120 once the reductant insertion assembly 120 is shut down. For example, the return line may include an orifice or a passive or active valve which opens once the operating pressure of the pump 122 exceeds a pressure threshold and/or once the reductant insertion assembly 120 is shut-down. The opening of the valve allows at least a portion of the over pressurized reductant to be communicated back to the tank 110 via the return line, thereby relieving the over pressure.

In some instances, the operating pressure of the pump 122 may not have been relieved after a previous shutdown due to a blockage in a reductant delivery line, return line or nozzle. This may lead to a "no-pressure" indication at the reductant insertion assembly 120 so that sensing of actual remaining pressure in the reductant insertion assembly by the sensing circuitry 130 may not be possible. By adjusting the initial threshold to a value that prevents the pump 222 from starting if the reductant insertion assembly 120 is already pressurized preventing excessive pressure buildup. In various embodiments, in which the sensing circuitry 130 includes a rotor position sensor (e.g., the sensor 176), the initial threshold may include a threshold current determined by the rotor position sensor. The controller 170 may determine a current consumed by the pump 122 and stop the pump 122 if the current consumption is too high. Furthermore, the dosing valve 126 may be activated to relieve the pressure once the reductant insertion assembly 120 is turned on.

Once the initial electrical parameter value or otherwise, the initial operating pressure of the pump 122 is below the predetermined initial threshold the controller 170 restarts the pump 122. In this manner, the pressure relief is provided electronically to the pump 122 without using any passive pressure relief valve or any other mechanical pressure relief mechanism, thereby reducing manufacturing as well as maintenance costs.

Although not shown in FIG. 1, the aftertreatment system 100 can include sensors such as, for example, temperature sensors, pressure sensors, NOx sensors, oxygen sensors, ammonia sensors and/or any other sensors. The controller 170 may be communicatively coupled to one or more such sensors to receive and interpret signals from one or more of these sensors. The controller 170 may use the information from one or more of these sensors to determine the flow conditions of the exhaust gas (e.g., to determined dosing rate), the operating threshold, and/or the initial threshold. In particular embodiments, the controller 170 can also be configured to receive and interpret data from temperature sensors, NOx sensors, oxygen sensors, ammonia sensors and/or any other sensors which may be included in the aftertreatment system 100.

Figure 4:
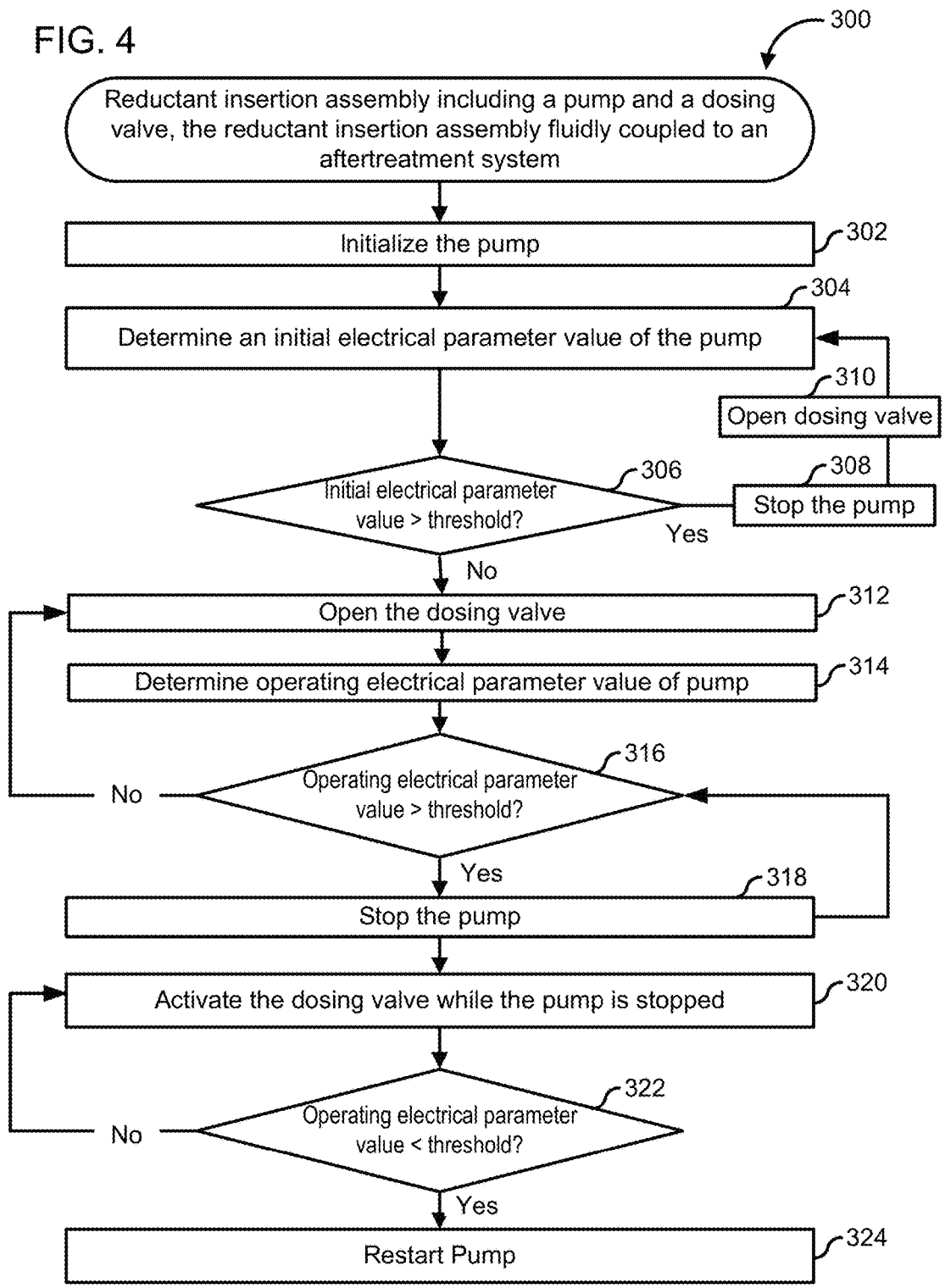
FIG. 4 is a schematic flow diagram of a method of preventing operating pressure of a pump included in a reductant insertion assembly of an aftertreatment system from exceeding a threshold pressure value of the pump.

FIG. 4 is a schematic flow diagram of an example method 300 of delivering a reductant to an aftertreatment system (e.g., the aftertreatment system 100 or 200) using a reductant insertion assembly (e.g., the reductant insertion assembly 120 or 220) structured to be fluidly coupled to the aftertreatment system. The reductant insertion assembly includes a pump (e.g., the pump 122 or 222), and a dosing valve (e.g., the dosing valve 126). The operations of the method 300 can be stored in the form of instructions on a non-transitory CRM (e.g., the memory 174 of the controller 170, or main memory 636, read only memory (ROM) 638 or storage device 640 included in the computing device 630 of FIG. 19). The CRM can be included in a computing device (e.g., the computing device 630) which is configured to execute the instructions stored on the CRM to perform the operations of the method 300.

The method 300 includes initializing the pump to pressurize a reductant in the pump to an operating pressure of the pump at 302. For example, the controller 170 or 270 can initialize the pump 122 or 222 so that the motor (e.g., the motor 224) included in the pump 122 or 222 applies a torque (e.g., a diaphragm or membrane included in the pump 122) to pressurize the reductant in the pump.

In various embodiments, an initial electrical parameter value of the pump is determined at 304. The initial electrical parameter value is indicative of an initial pressure value of the pump. For example, the controller 170 or 270 determines the initial electrical parameter value of the pump 122 or 222 which can, for example include a current consumed by the motor (e.g. the motor 224) of the pump 122 or 222 when the pump is initialized.

It is determined if the initial electrical parameter value exceeds a predetermined initial threshold at 306. For example, the controller 170 or 270 determines if the initial electrical parameter value (e.g., an initial current consumed by the motor of the pump 122 or 222) exceeds the predetermined initial threshold (e.g., an initial threshold current corresponding to an initial threshold pressure of the pump 122). In response to the initial threshold exceeding the predetermined threshold, the pump is stopped at 308. For example, the controller 170 or 270 stops the pump 122 or 222.

In some embodiment, the dosing valve is activated while the pump is stopped at 310. The activating of the dosing valve (e.g., the dosing valve 126) allows the reductant to be inserted into the aftertreatment system while the pump (e.g., the pump 122 or 222) is stopped. This releases and reduces the pressure in the pump to below the initial threshold. The pump (e.g., the pump 122 or 222) is then restarted to pressurize the reductant to the operating pressure of the pump.

The dosing valve is opened to insert the reductant into the aftertreatment system at 312. For example, the controller 170 instructs the dosing valve 126 to open, thereby inserting the reductant into the aftertreatment system 100 at an operating pressure of the pump 122. An operating electrical parameter value of the pump is determined at 314. For example, the controller 170 or 270 determines an operating electrical parameter value of the pump 122 or 222 (e.g., a current consumed by the motor of the pump 122 or 222). The operating electrical parameter value is indicative of the operating pressure of the pump.

It is determined if the operating electrical parameter value exceeds a predetermined threshold at 316. If the operating electrical parameter value exceeds the predetermined threshold, then the pump is stopped at 318. For example, the controller 170 or 270 determines if the operating electrical parameter value, for example a current consumed by the motor of the pump 122 or 222 is exceeding the operating threshold, for example a threshold current corresponding to a threshold operating pressure of the pump 122 or 222. If the operating electrical parameter value exceeds the operating threshold, then the controller 170 or 270 stops the pump 122 or 222.

In various embodiments, the dosing valve is activated while the pump is stopped at 320. For example, the controller 170 activates the dosing valve 126 to insert the reductant into the SCR system 150 of the aftertreatment system 100. This releases the pressure built up in the pump 122, thereby reducing the operating pressure of the pump 122. It is determined if the operating electrical parameter value of the pump has fallen below the operating threshold at 322. If the operating electrical parameter value of the pump falls below the operating threshold, then the pump is restarted at 324.

For example, the controller 170 or 270 activates the dosing valve (e.g., the dosing valve 126) for a predetermined time to insert the reductant into the aftertreatment system 100, thereby reducing the operating pressure of the pump 122 or 222 while the pump 122 or 222 is stopped. After the predetermined time (e.g., 1, 2, 4, 6, 8 or 10 seconds inclusive of all ranges and values therebetween) or in real time, the controller 170 or 270 again determines if the operating electrical parameter value corresponds to the operating pressure of the pump 122 or 222 has fallen below the operating threshold. If the operating electrical parameter value is still above the operating threshold, then the controller 170 or 270 continues activating the dosing valve 126 while the pump 122 or 222 is stopped to further reduce the operating pressure. Once the operating electrical parameter value falls below the operating threshold, the controller 170 or 270 restarts the pump 122 or 222.

In various embodiments, the method 300 can include stopping the pump (e.g., the pump 122/222) if the reductant insertion assembly (e.g., the reductant insertion assembly 120/220) is pressurized when the reductant insertion assembly is started. For example, a blockage in a reductant delivery line or nozzle can prevent pressure from being released. If the pump is initialized, this can over pressurize the reductant insertion assembly. To prevent this scenario, the pump is not initialized if at least a portion of the reductant insertion assembly (e.g., fluidly coupled to a discharge side of the pump 122/222) is pressurized.

In some embodiments, the method 300 includes initializing the pump if an operating pressure is below the initial threshold. The operating electrical parameter is determined. If the electrical parameter is below a predetermined initial operating pressure threshold, the operating pressure of the pump is limited to below a predetermined value. For example, if a reductant delivery line for delivering the reductant from the pump 122/222 is disconnected or leaking, the sensing circuitry 130/230 will determine that the reductant insertion assembly 120/320 or at least a portion of the reductant insertion assembly 120/220 on the discharge side of the pump 122/222 is not pressurized.

The pump 122/222 will therefore be initialized; however the torque of the motor (e.g., the motor 224) of the pump 122/222 may be very low as there is very little or no load on the motor due to the reductant delivery line being disconnected. The low torque corresponds to a low operating electrical parameter (e.g., current) indicating that the reductant delivery line is disconnected or leaking. Thus, the controller 170/270 may limit the operating pressure of the pump 122/322 to be within the predetermined value, thereby preventing further damage to the pump 122/322 or the reductant delivery line. In some embodiments, the method 300 can also include generating a fault code or lighting a malfunction indicator lamp (MIL) in such instances.

Figure 5:
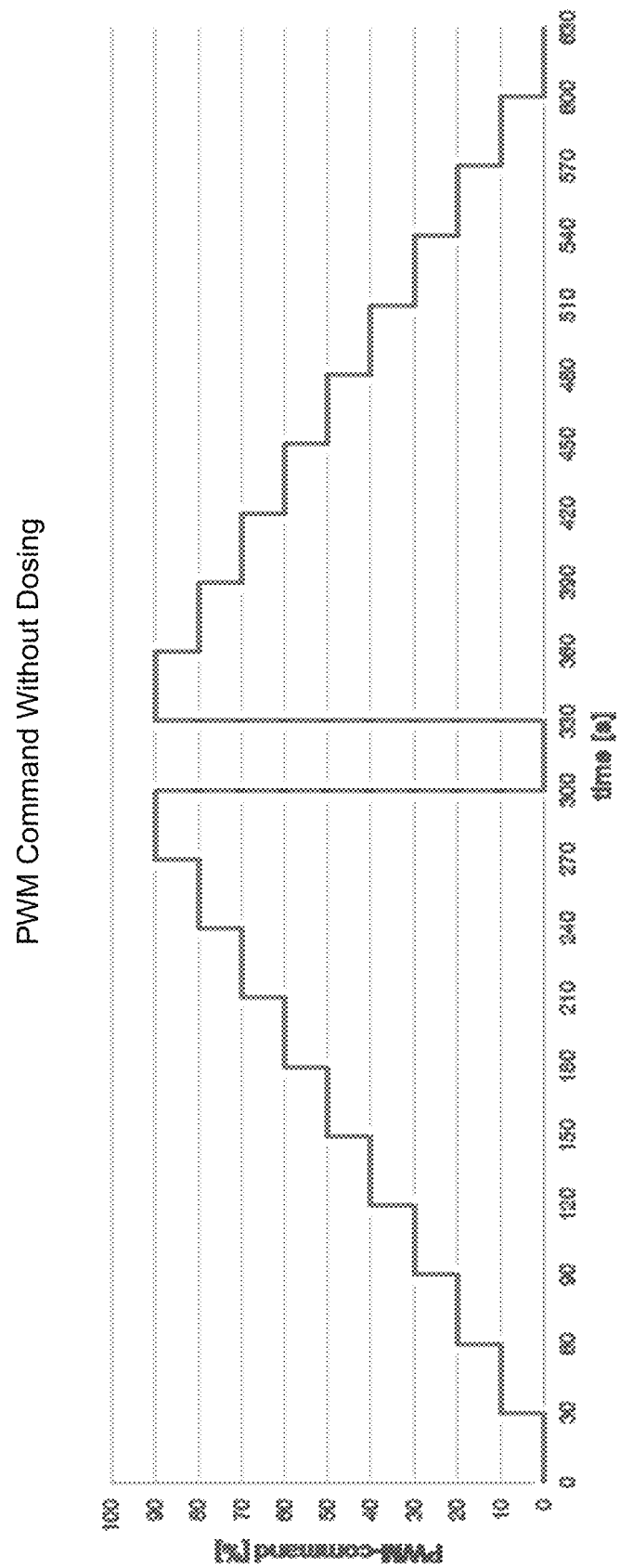
Figure 6:
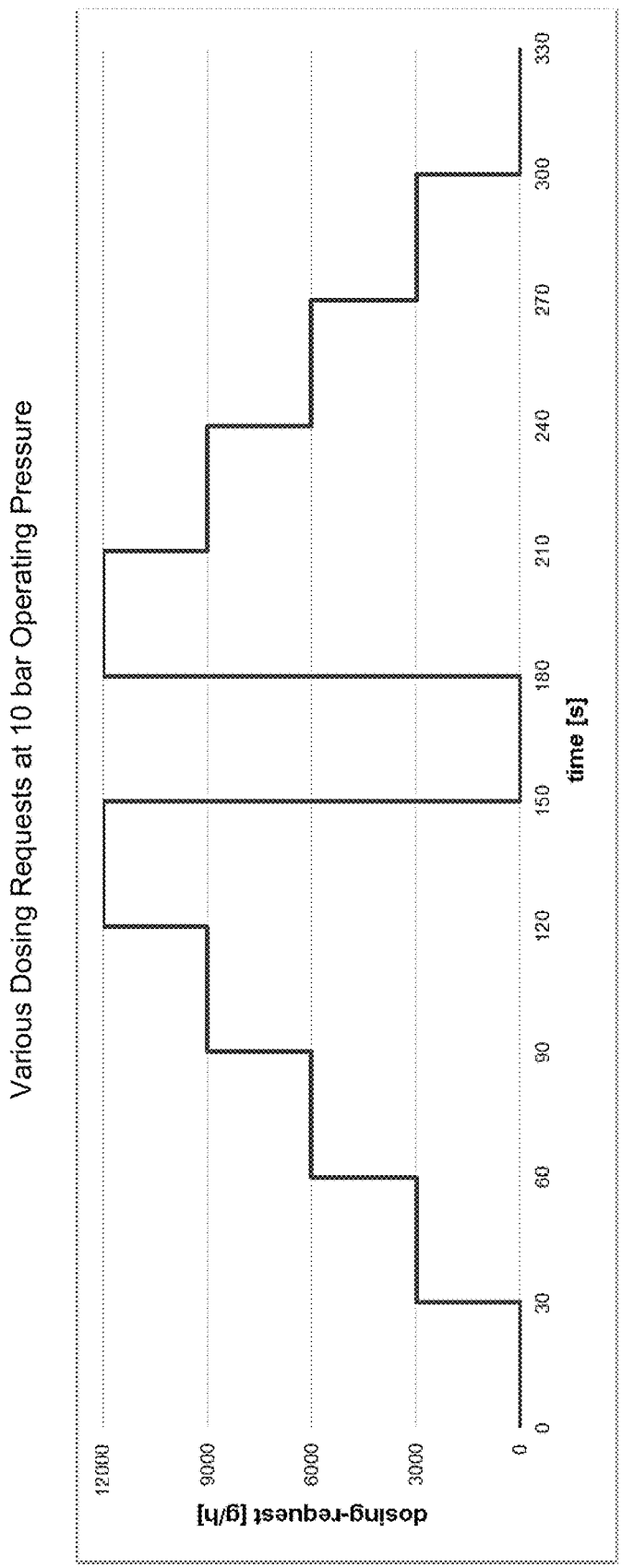

FIGS. 5-6 are various plots of operating signals, operating pressures, pump speeds and dosing commands of a first pump including a mechanical pressure relief (MPR) and a second pump including electronic pressure relief (EPR) which does not include a mechanical pressure relief valve and provides pressure relief using the systems and methods described herein (e.g., the method 300). FIG. 5 is a plot of an example PWM command or signal for operating the pumps. FIG. 6 is a plot of dosing or insertion of a reductant at 10 bar operating pressure using the PWM command of FIG. 5.

Figure 7:
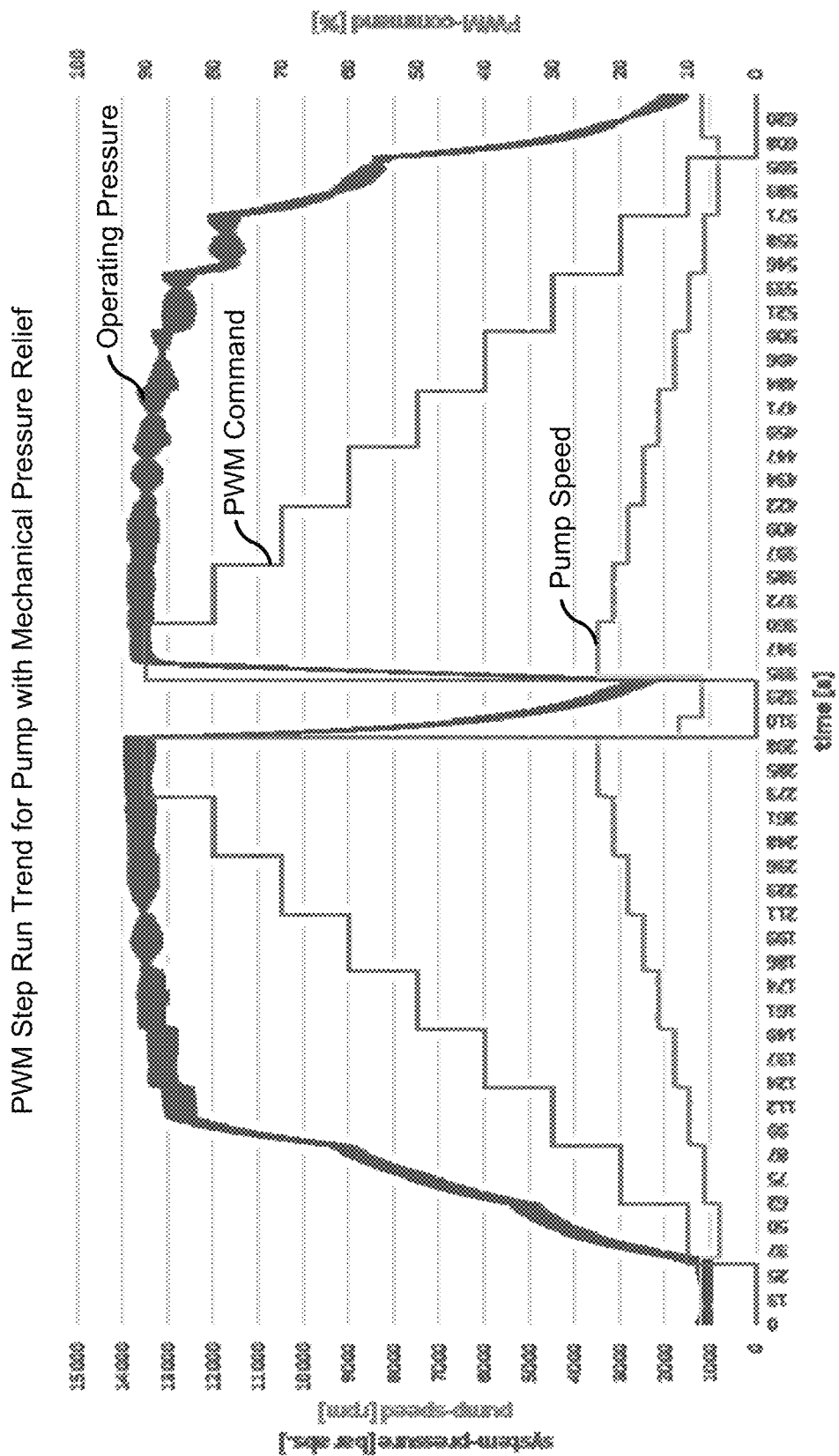
Figure 8:
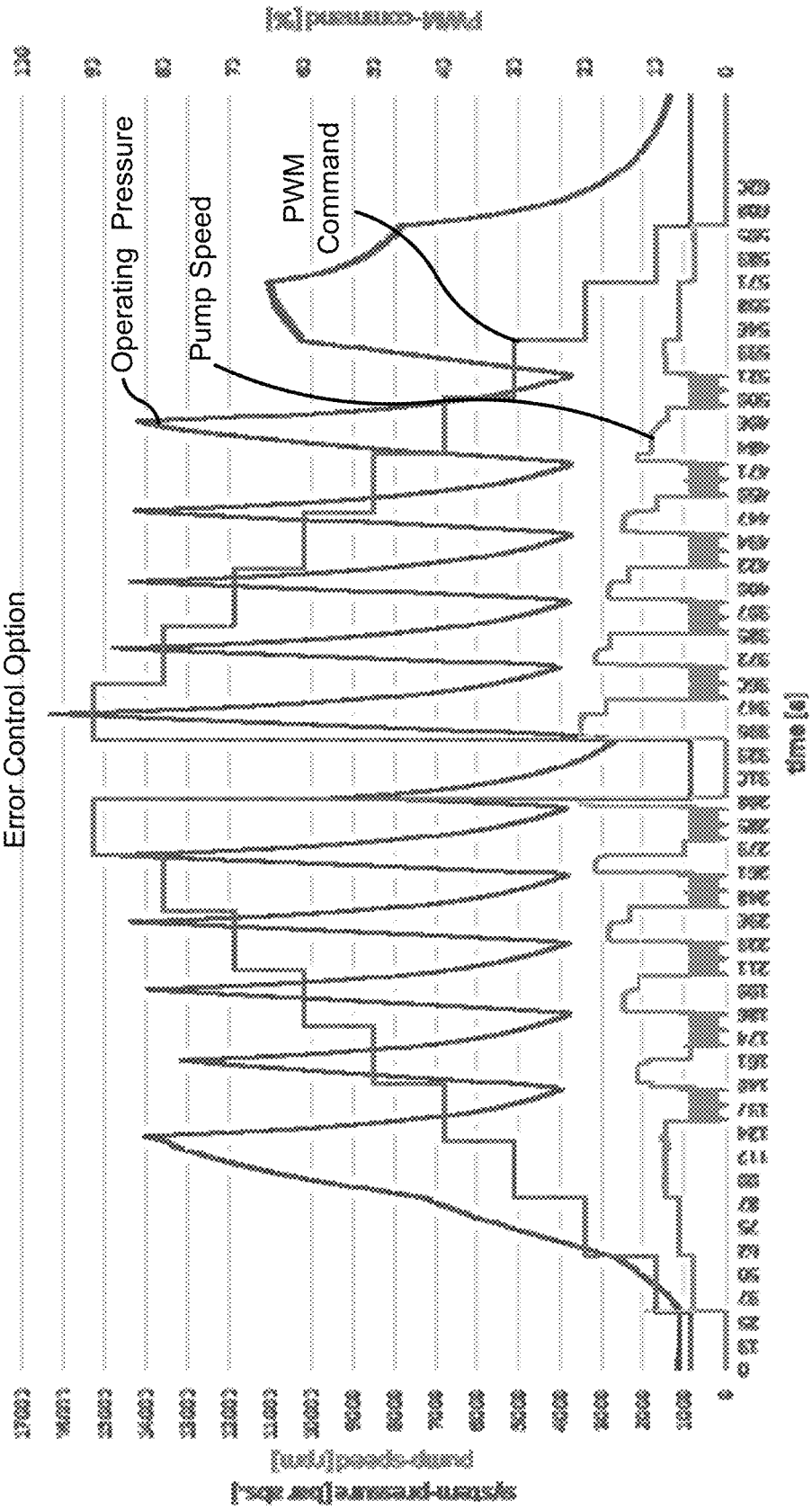
Figure 9:
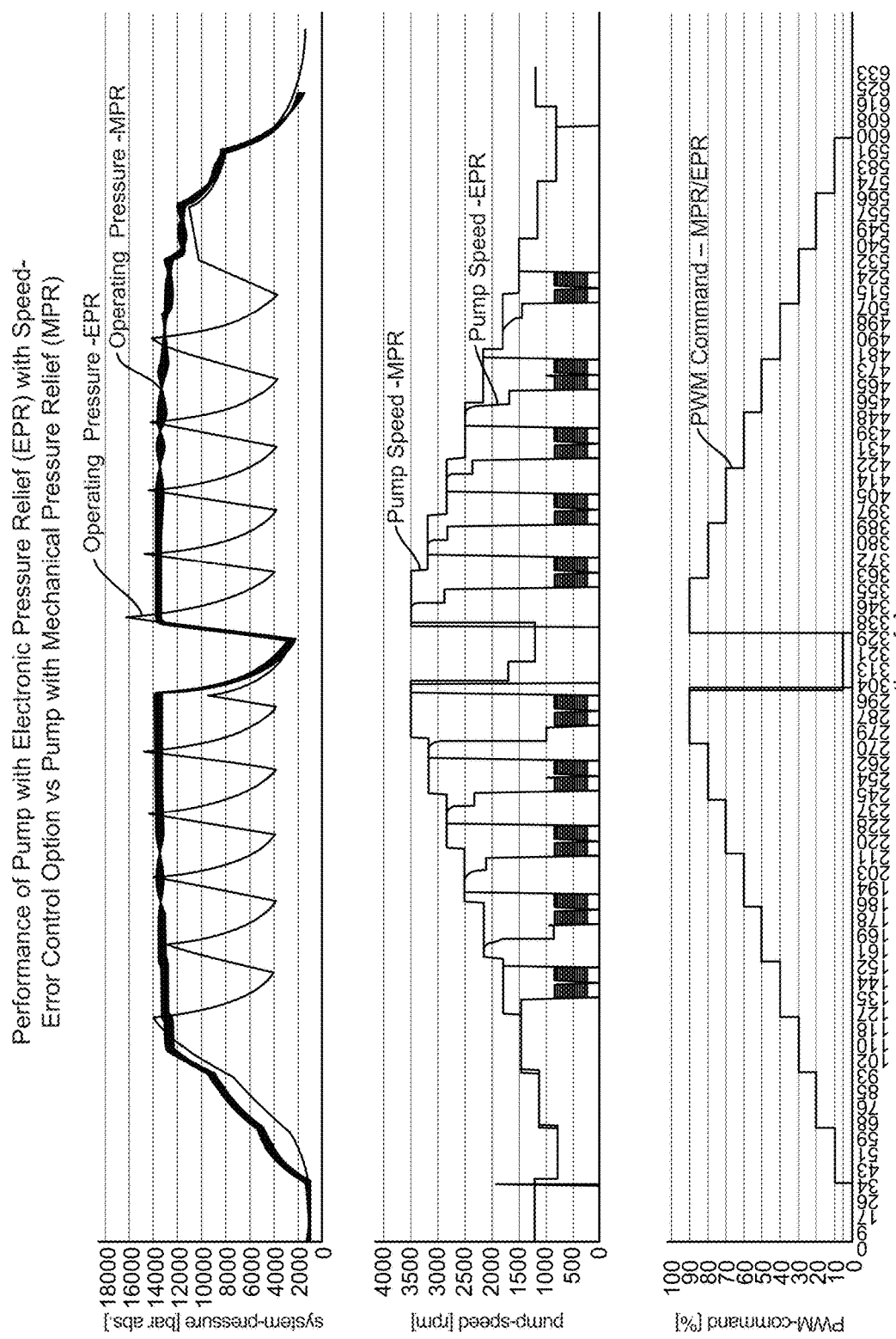

FIG. 7 is a plot of operating pressure and pump speed of the first pump in response to a test PWM command. FIG. 8 is a plot of operating pressure and pump speed of the second pump in response to the same test PWM command, and FIG. 9 includes the plots of FIG. 7 and FIG. 8 superimposed on each other. The second pump is provided with speed-error control option or functionality. The speed-error control option shuts off the second pump if the second pump fails to attain a predetermined speed after a predetermined time, for example due to torque limitation (e.g., due to a broken or disconnected reductant delivery line). Large variations in the operating pressure of the second pump are observed relative to the first pump as the second pump shuts off and turns on based on the pump speed.

Figure 10:
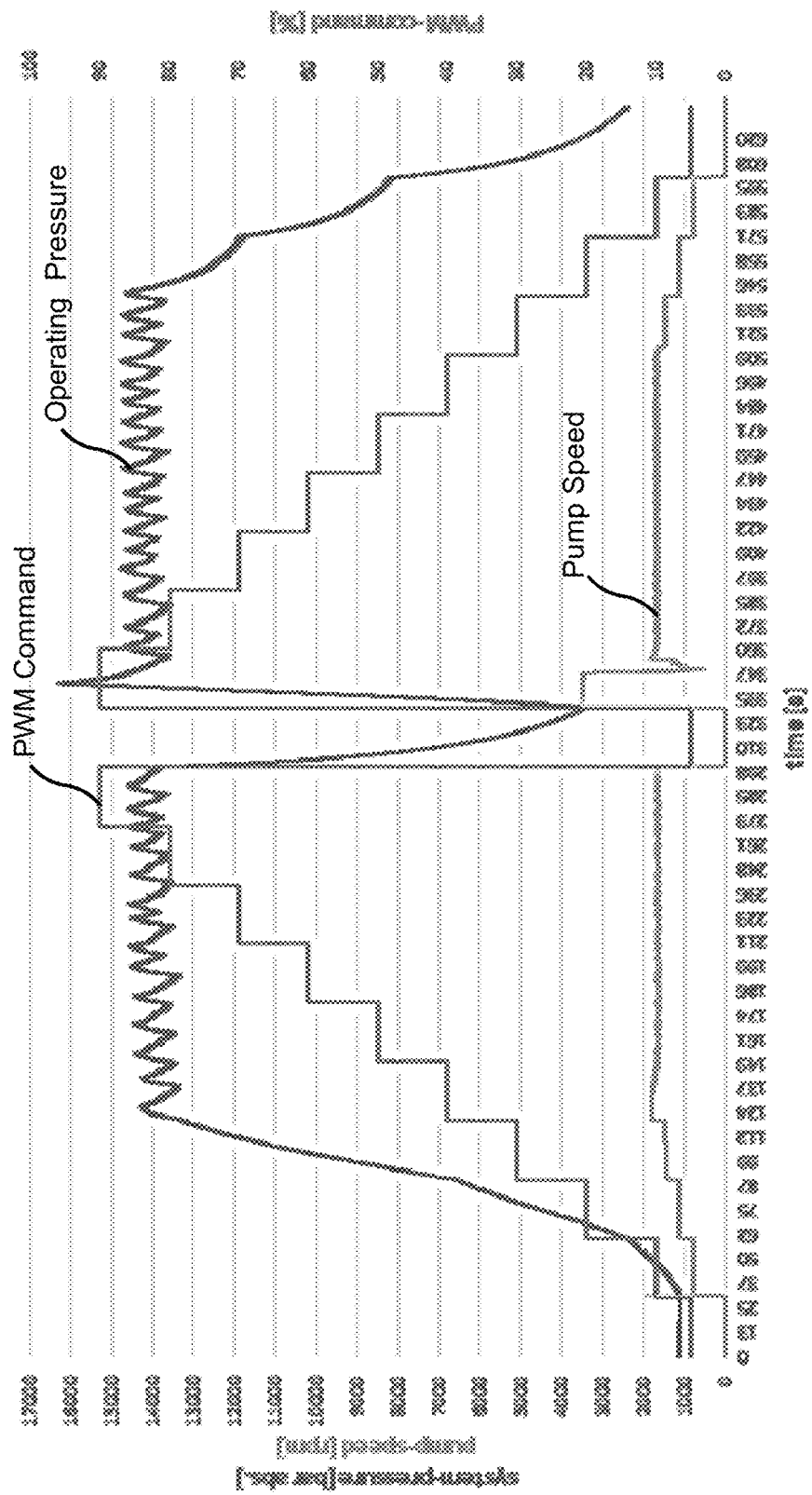
Figure 11:
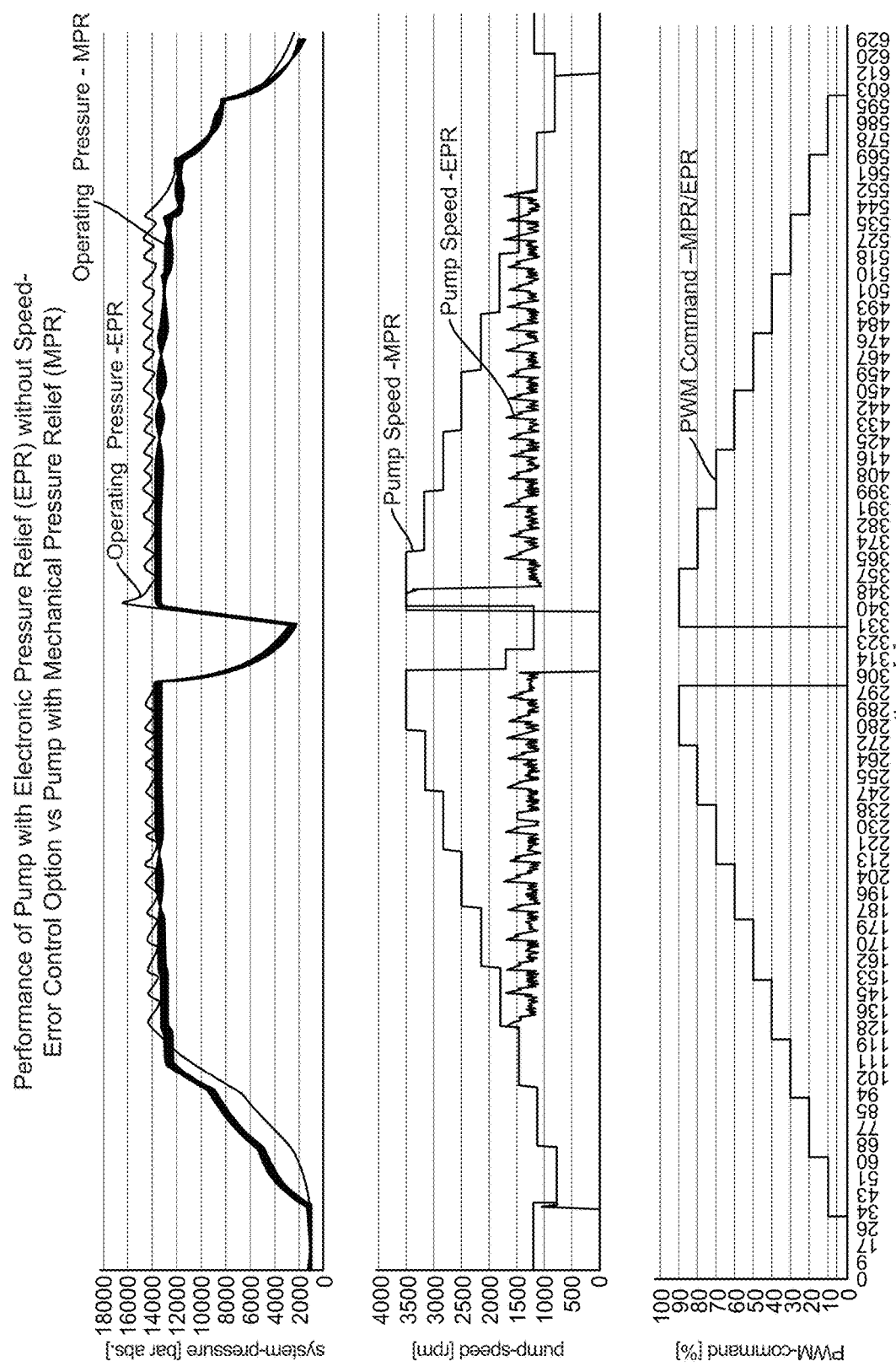
Figure 12:
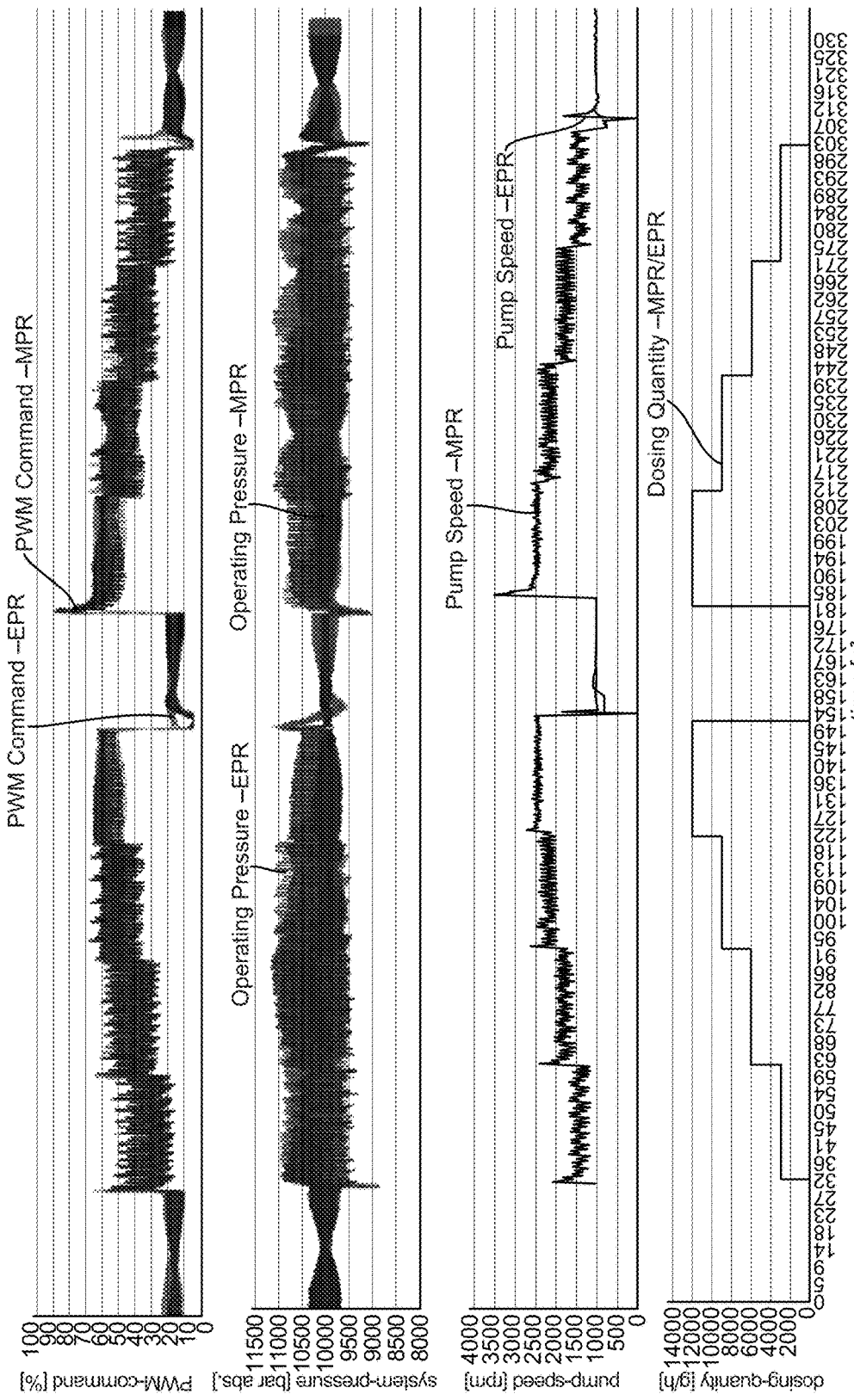
Figure 13:
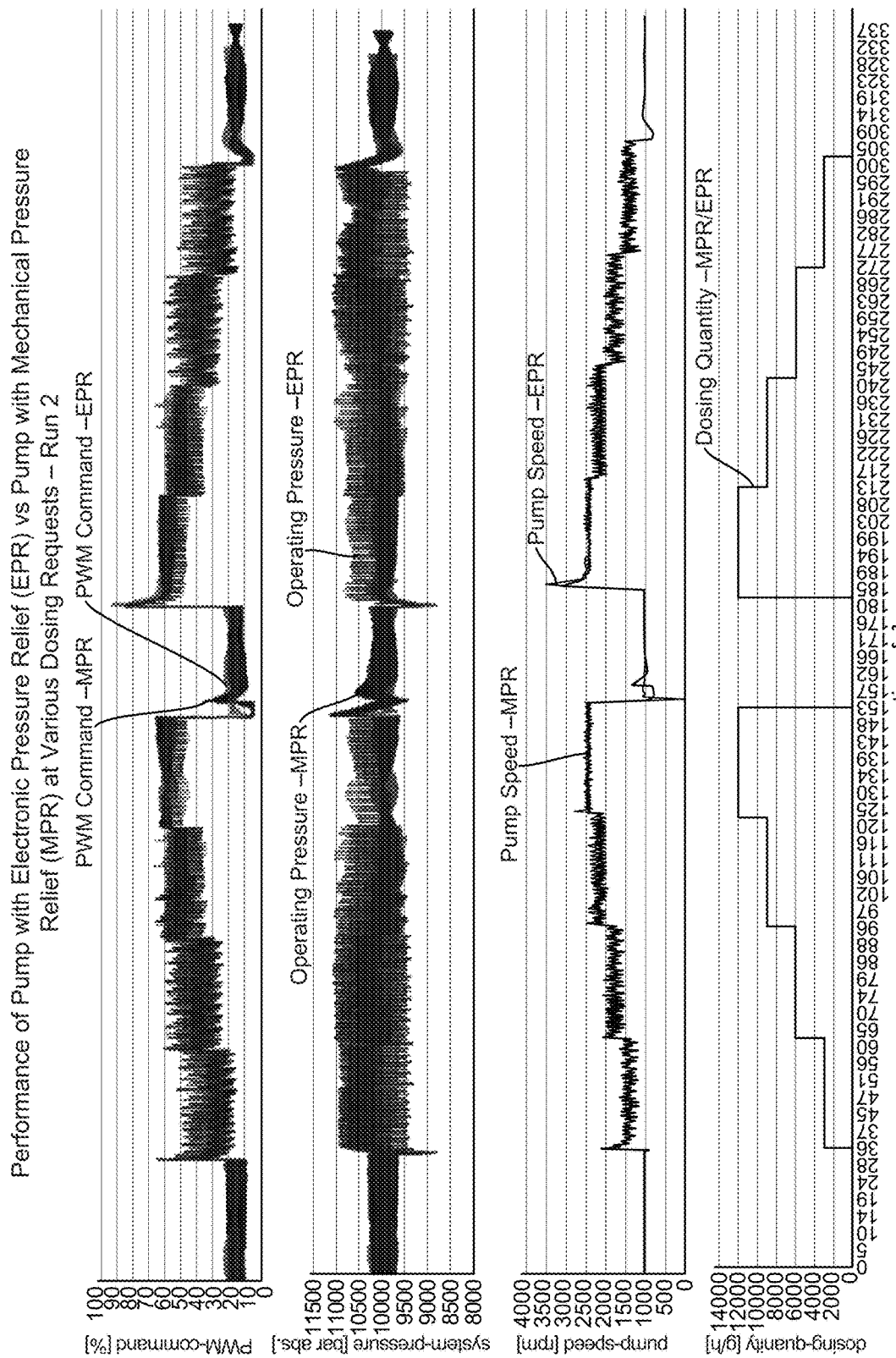
Figure 15:
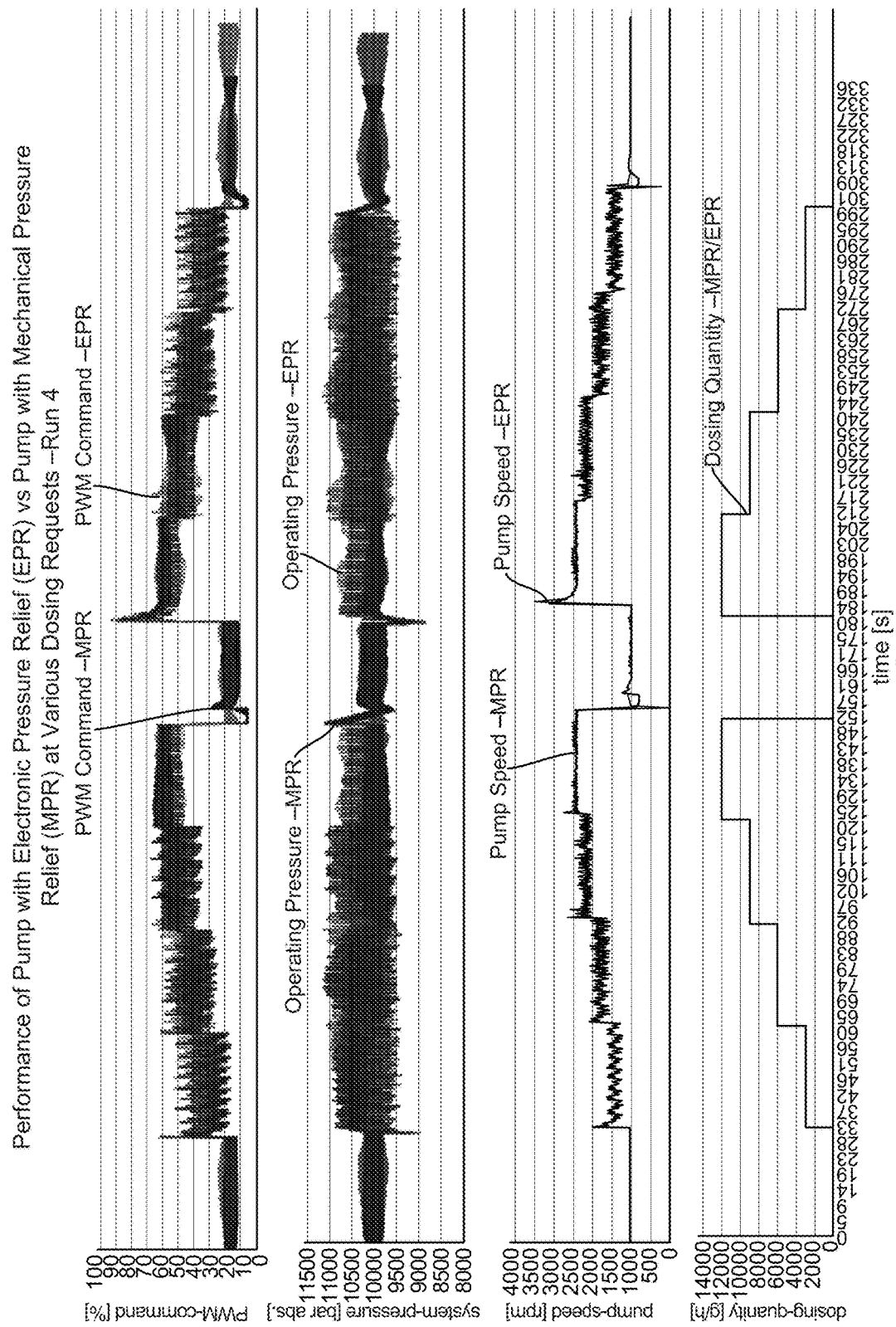
Figure 16:
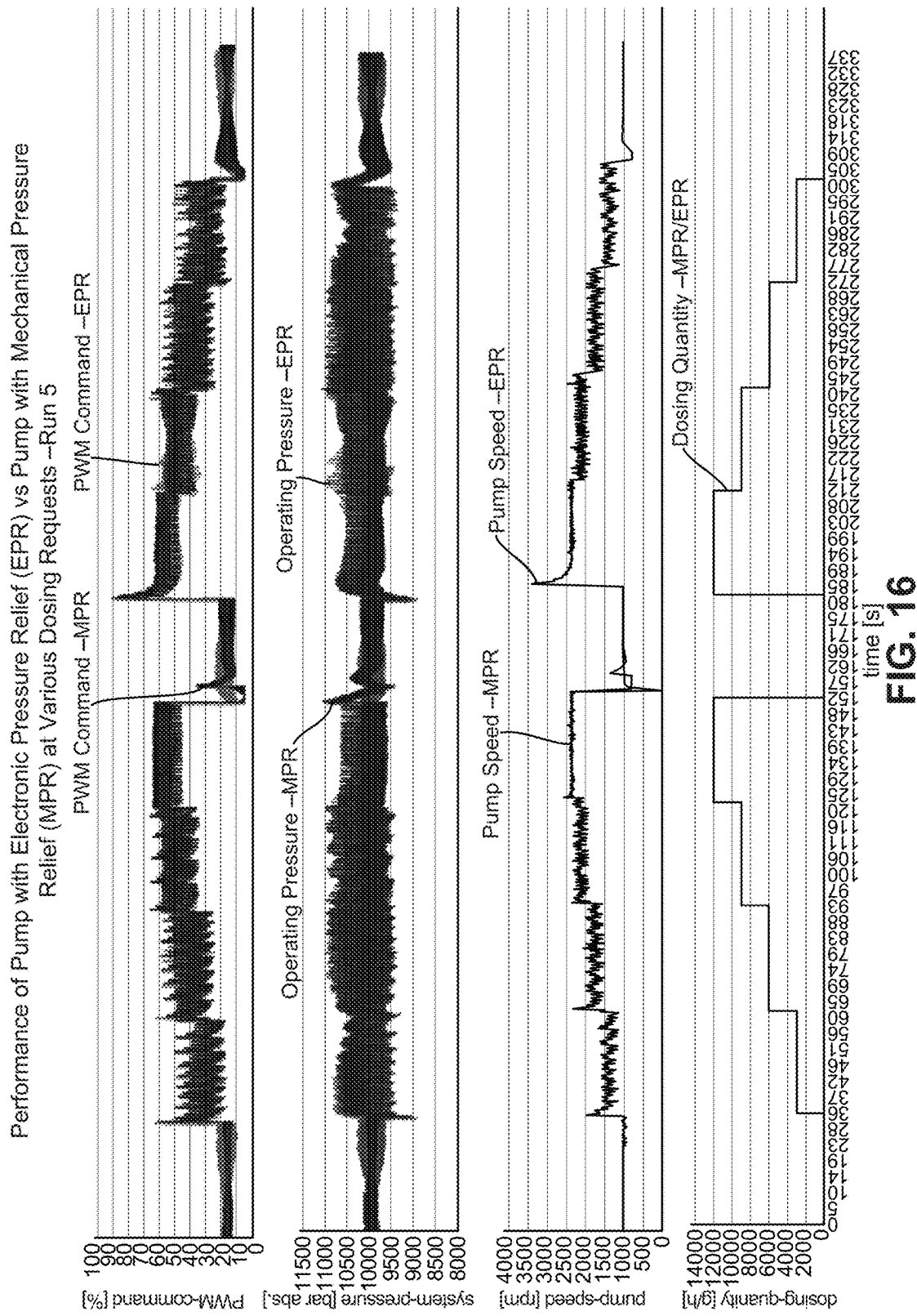

FIG. 10 is a plot of operating pressure and pump speed of the second pump in response to the same test PWM command without the speed-error control option, and FIG. 11 includes the plots of FIG. 7 and FIG. 11 superimposed on each other. The second pump is provided without speed-error control option or functionality. Much smaller variations in the operating pressure of the second pump are observed relative to the first pump so that the performance of the second pump is substantially similar to the first pump. FIGS. 12-16 shows performance the first pump and the second pump at various dosing requests.

Figure 17:
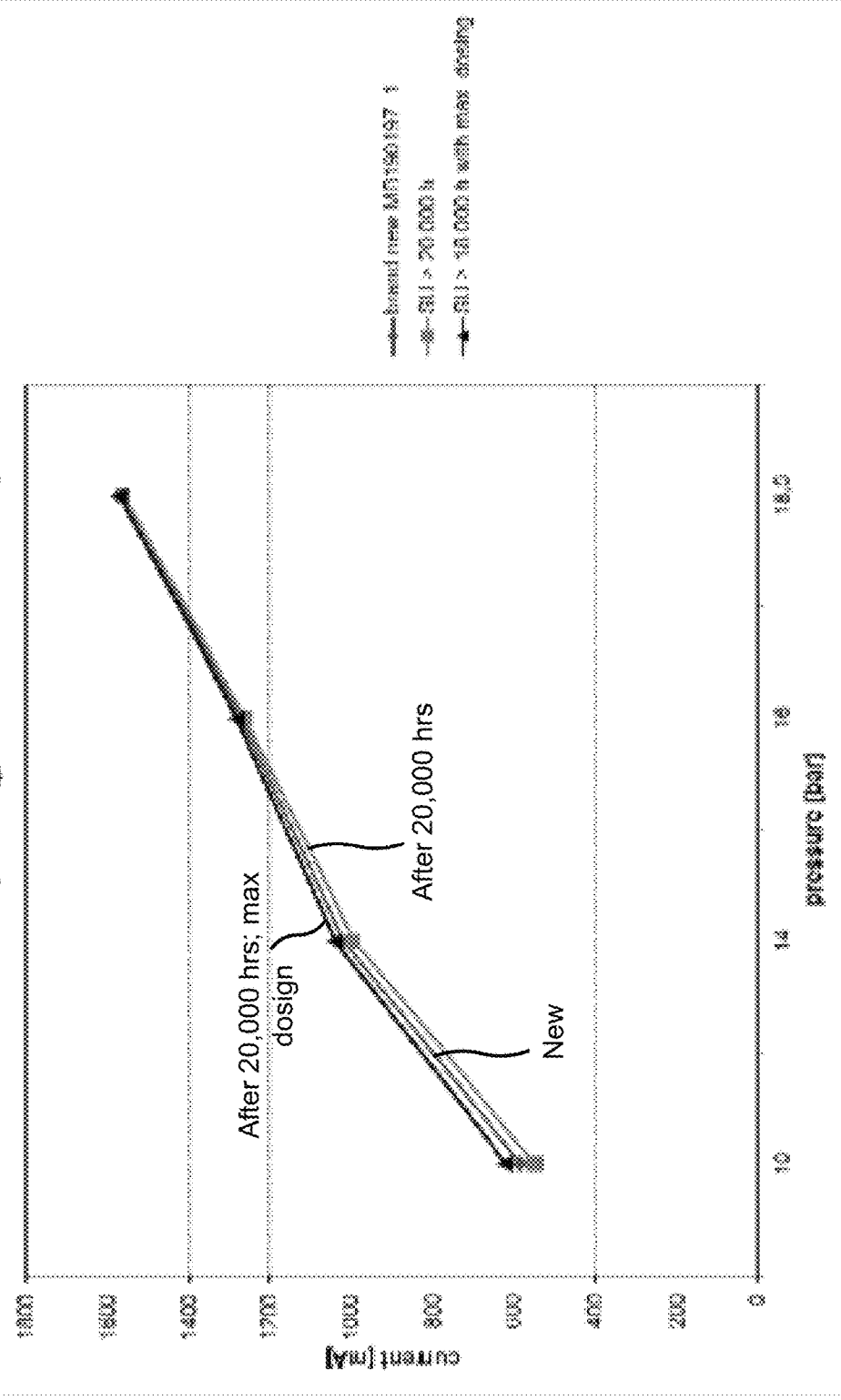
FIGS. 17 and 18 are plots of operating pressure vs current consumed by pumps operated at 14 Volts or 27 Volts, respectively for a new pump, a pump operated for greater than 20,000 hours and a pump operated at maximum dosing rate for greater than 20,000 hours.
Figure 18:
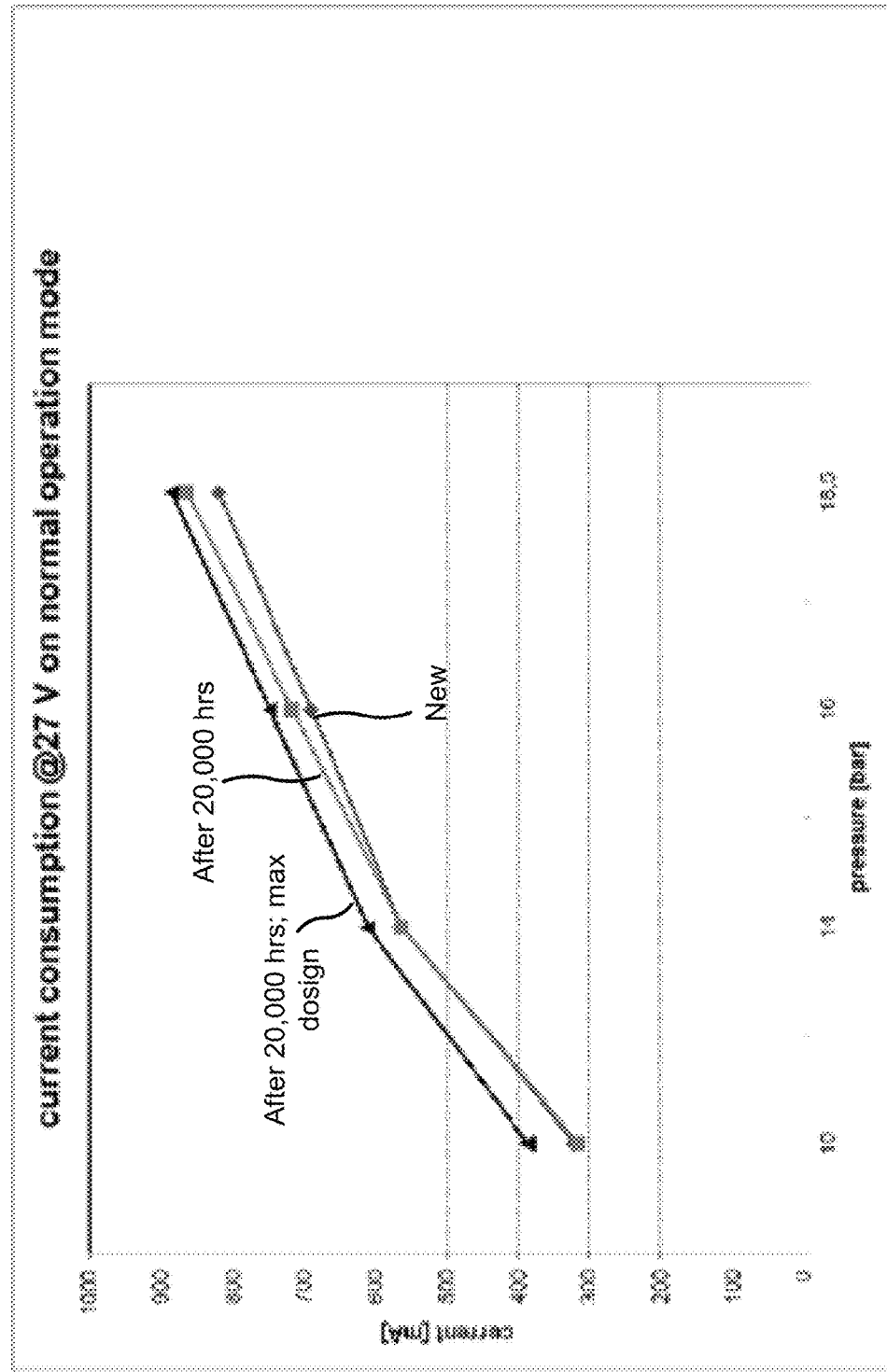

FIGS. 17 and 18 are plots of current consumed vs operating pressure of a new pump, another pump after 20,000 hours of operation and a third pump after 20,000 hours of operation at maximum dosing, with the pumps operating at 14 Volts and 27 Volts. Increase in pressure of the pumps at each of the 14 Volts and the 27 Volts operating voltages correlates to a corresponding current increase in the current consumed by the pump. The pressure vs current plot of the new pump is not significantly for the pump operated for 20,000 hours, and the pump operated at maximum dosing for 20,000 hours indicating that the current/pressure relationship remains remarkably consistent over the lifetime of the pump. Thus, the current/pressure relationship can be reliably implemented in a lookup table or algorithm for determining the operating pressure of the pump using the current consumed by the pump.

Figure 19:
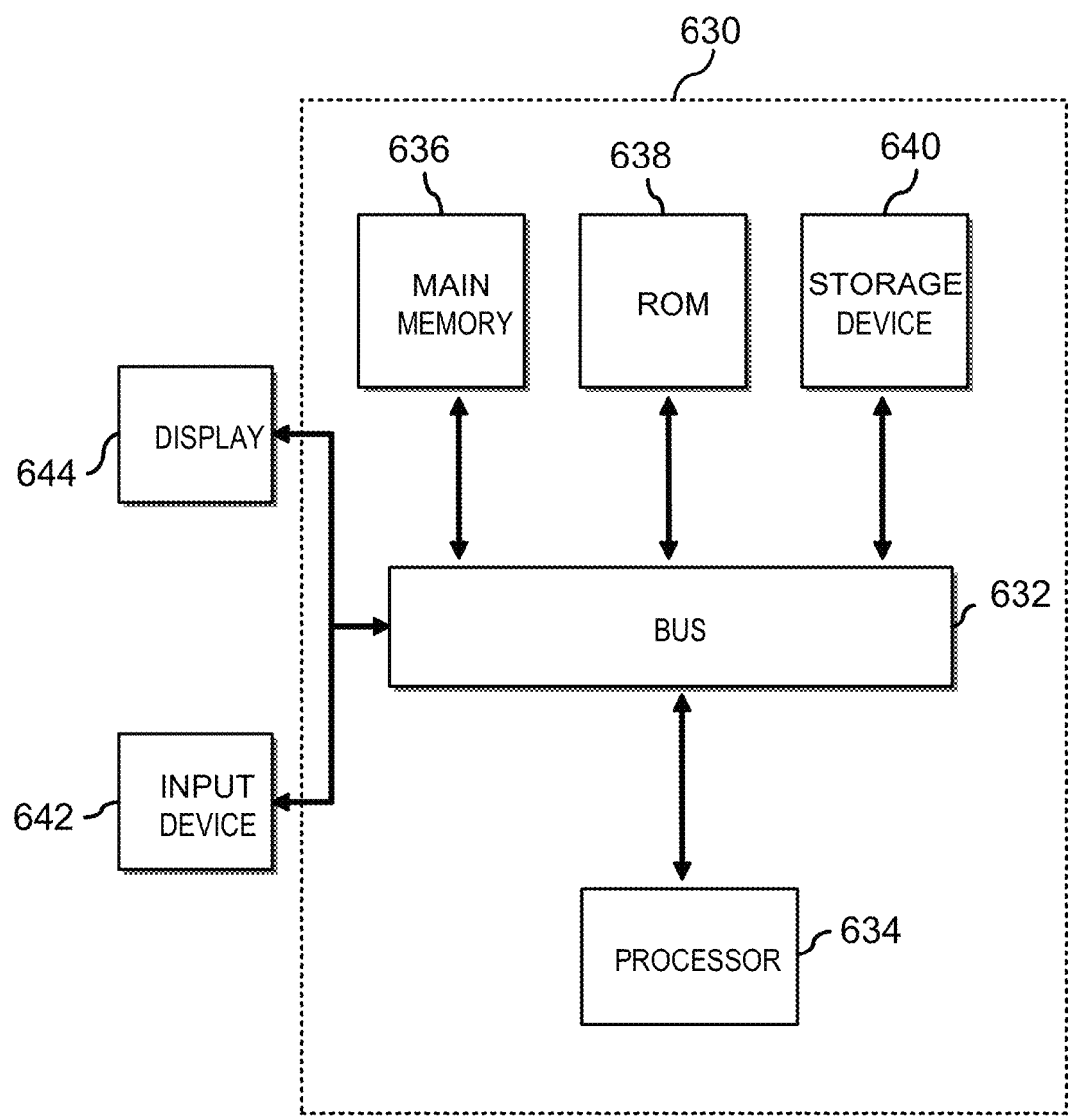
FIG. 19 is a schematic block diagram of an embodiment of a computing device which can be used as the controller included in the aftertreatment system of FIG. 1.

In some embodiments, the controller 170, 270 or any of the controllers described herein can be a system computer of an apparatus or system which includes the aftertreatment system 100 or 200 (e.g., a vehicle, an engine or generator set, etc.). For example, FIG. 19 is a block diagram of a computing device 630 in accordance with an illustrative implementation. The computing device 630 can be used to perform any of the methods or the processes described herein, for example the method 400. In some embodiments, the controller 170 or 270 can include the computing device 630. The computing device 630 includes a bus 632 or other communication component for communicating information. The computing device 630 can also include one or more processors 634 or processing circuits coupled to the bus for processing information.

The computing device 630 also includes main memory 636, such as a random access memory (RAM) or other dynamic storage device, coupled to the bus 632 for storing information, and instructions to be executed by the processor 634. Main memory 636 can also be used for storing position information, temporary variables, or other intermediate information during execution of instructions by the processor 634. The computing device 630 may further include a read only memory (ROM) 638 or other static storage device coupled to the bus 632 for storing static information and instructions for the processor 634. A storage device 640, such as a solid-state device, magnetic disk or optical disk, is coupled to the bus 632 for persistently storing information and instructions.

The computing device 630 may be coupled via the bus 632 to a display 635, such as a liquid crystal display, or active matrix display, for displaying information to a user. An input device 642, such as a keyboard or alphanumeric pad, may be coupled to the bus 632 for communicating information and command selections to the processor 634. In another implementation, the input device 642 has a touch screen display 644.

According to various implementations, the processes and methods described herein can be implemented by the computing device 630 in response to the processor 634 executing an arrangement of instructions contained in main memory 636 (e.g., the operations of the method 400). Such instructions can be read into main memory 636 from another non-transitory computer-readable medium, such as the storage device 640. Execution of the arrangement of instructions contained in main memory 636 causes the computing device 630 to perform the illustrative processes described herein. One or more processors in a multi-processing arrangement may also be employed to execute the instructions contained in main memory 636. In alternative implementations, hard-wired circuitry may be used in place of or in combination with software instructions to effect illustrative implementations. Thus, implementations are not limited to any specific combination of hardware circuitry and software.

Although an example computing device has been described in FIG. 19, implementations described in this specification can be implemented in other types of digital electronic circuitry, or in computer software, firmware, or hardware, including the structures disclosed in this specification and their structural equivalents, or in combinations of one or more of them.

Implementations described in this specification can be implemented in digital electronic circuitry, or in computer software, firmware, or hardware, including the structures disclosed in this specification and their structural equivalents, or in combinations of one or more of them. The implementations described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An aftertreatment system comprising;
a selective catalytic reduction system including a catalyst for reducing constituents of an exhaust gas;
a reductant storage tank;
a reductant insertion assembly fluidly coupled to the reductant storage tank and the selective catalytic reduction system, the reductant insertion assembly comprising a pump and a dosing valve fluidly coupled to the pump;
a sensing circuitry configured to sense parameters from which a torque generated by the pump is determinable; and
a controller communicatively coupled to the reductant insertion assembly and the sensing circuitry, the controller configured to:
initialize the pump so as to pressurize a reductant in the pump,
open the dosing valve, thereby inserting the reductant into the selective catalytic reduction system,
determine the torque generated by the pump based on the parameters sensed by the sensing circuitry, the torque being indicative of an operating pressure of the pump, and
in response to the torque exceeding a threshold, stop the pump.

2. The aftertreatment system of claim 1, wherein the controller is configured to adjust the threshold based on a value of an operating signal.

3. The aftertreatment system of claim 2, wherein the controller is configured to adjust the threshold based on an operating temperature of the pump.

4. The aftertreatment system of claim 1, wherein the reductant insertion assembly does not include a pressure relief valve.

5. The aftertreatment system of claim 1, wherein the sensing circuitry comprises a rotor position sensor and an acceleration sensor.

6. An aftertreatment system comprising;
a selective catalytic reduction system including a catalyst for reducing constituents of an exhaust gas;
a reductant storage tank;
a reductant insertion assembly fluidly coupled to the reductant storage tank and the selective catalytic reduction system, the reductant insertion assembly comprising a pump and a dosing valve fluidly coupled to the pump;
a sensing circuitry configured to sense parameters from which a torque generated by the pump is determinable; and
a controller communicatively coupled to the reductant insertion assembly and the sensing circuitry, the controller configured to:
initialize the pump so as to pressurize a reductant in the pump,
open the dosing valve, thereby inserting the reductant into the selective catalytic reduction system,
determine the torque generated by the pump based on the parameters sensed by the sensing circuitry, the torque being indicative of an operating pressure of the pump,
in response to the torque exceeding a threshold, stop the pump; and
activate the dosing valve while the pump is stopped, the activating allowing the reductant to be inserted into the selective catalytic reduction system through the dosing valve while the pump is stopped.

7. The aftertreatment system of claim 6, wherein the controller is further configured to restart the pump in response to the torque falling below the threshold.

8. An aftertreatment system comprising;
a selective catalytic reduction system including a catalyst for reducing constituents of an exhaust gas;
a reductant storage tank;
a reductant insertion assembly fluidly coupled to the reductant storage tank and the selective catalytic reduction system, the reductant insertion assembly comprising a pump and a dosing valve fluidly coupled to the pump;
a sensing circuitry configured to sense parameters from which a torque generated by the pump is determinable; and
a controller communicatively coupled to the reductant insertion assembly and the sensing circuitry, the controller configured to:
initialize the pump so as to pressurize a reductant in the pump, open the dosing valve, thereby inserting the reductant into the selective catalytic reduction system, determine the torque generated by the pump based on the parameters sensed by the sensing circuitry, determine a current value of a current consumed by the pump based on the determined torque generated by the pump, the current value being indicative of an operating pressure of the pump, and in response to the current value exceeding a predetermined threshold current value, stop the pump.

9. A reductant insertion assembly comprising:
a pump;
a dosing valve fluid coupled to the pump;
a sensing circuitry configured to sense parameters from which a torque generated by the pump is determinable; and
a controller communicatively coupled to the pump and the sensing circuitry, the controller configured to:
initialize the pump so as to pressurize a reductant in the pump,
open the dosing valve, thereby expelling a reductant therethrough,
determine the torque generated by the pump based on the parameters sensed by the sensing circuitry, the torque being indicative of an operating pressure of the pump, and
in response to the torque exceeding the threshold, stop the pump.

10. The reductant insertion assembly of claim 9, wherein the controller is configured to adjust the threshold based on a value of an operating signal of the pump.

11. The reductant insertion assembly of claim 9, wherein the controller is configured to adjust the threshold based on an operating temperature of the pump.

12. A reductant insertion assembly comprising:
a pump;
a dosing valve fluid coupled to the pump;
a sensing circuitry configured to sense parameters from which a torque generated by the pump is determinable; and
a controller communicatively coupled to the pump and the sensing circuitry, the controller configured to:
initialize the pump so as to pressurize a reductant in the pump,
open the dosing valve, thereby expelling a reductant therethrough,
determine the torque generated by the pump based on the parameters sensed by the sensing circuitry, the torque being indicative of an operating pressure of the pump,
in response to the torque exceeding a threshold, stop the pump, and
activate the dosing valve while the pump is stopped, the activating allowing the reductant to be expelled through the dosing valve while the pump is stopped.

13. The reductant insertion assembly of claim 12, wherein the controller is further configured to restart the pump in response to the torque falling below the threshold.

14. A reductant insertion assembly comprising:
a pump;
a dosing valve fluid coupled to the pump;
a sensing circuitry configured to sense parameters from which a torque generated by the pump is determinable; and
a controller communicatively coupled to the pump and the sensing circuitry, the controller configured to:

initialize the pump so as to pressurize a reductant in the pump,
open the dosing valve, thereby expelling a reductant therethrough,
determine the torque generated by the pump based on the parameters sensed by the sensing circuitry,
determine a current value of a current consumed by the pump based on the determined torque generated by the pump, the current value being indicative of an operating pressure of the pump, and
in response to the current value exceeding a predetermined threshold current value, stop the pump.

15. A method of operating a reductant insertion assembly comprising a pump and a dosing valve structured to be fluidly coupled to an aftertreatment system, the method comprising;
initializing the pump so as to pressurize a reductant in the pump to an operating pressure of the pump;
opening the dosing valve, thereby inserting a reductant into the aftertreatment system;
determining a torque generated by the pump;
determining if a current value of a current consumed by the pump based on the determined torque generated by the pump, the current value being indicative of the operating pressure of the pump; and
in response to the current value exceeding a predetermined threshold current value, stopping the pump.

16. A method of operating a reductant insertion assembly comprising a pump and a dosing valve structured to be fluidly coupled to an aftertreatment system, the method comprising;
initializing the pump so as to pressurize a reductant in the pump to an operating pressure of the pump;
opening the dosing valve, thereby inserting a reductant into the aftertreatment system;
determining a torque generated by the pump, the torque being indicative of the operating pressure of the pump;
in response to the torque exceeding a threshold, stopping the pump; and
activating the dosing valve while the pump is stopped, the activating allowing the reductant to be inserted into the aftertreatment system while the pump is stopped.

17. The method of claim 16, further comprising:
restarting the pump in response to the torque falling below the threshold.

18. A control circuitry, comprising:
a controller configured to be communicatively coupled to a reductant insertion assembly including a pump, a dosing valve fluidly coupled to the pump and a sensing circuitry, the controller comprising,
a torque adjusting circuity configured to initialize the pump so as to pressurize a reductant in the pump and determine a torque generated by the pump based on parameters sensed by the sensing circuitry from which the torque is determinable,
a dosing control circuitry configured to open the dosing valve, thereby expelling a reductant therethrough, and
a pressure determining circuitry configured to determine an operating pressure of the pump based on the torque;
wherein the pressure determining circuitry is configured to, in response to the torque exceeding a threshold, stop the pump; and
wherein the dosing control circuitry is configured to activate the dosing valve while the pump is stopped, the activating allowing the reductant to be expelled through the dosing valve while the pump is stopped.

19. The control circuitry of claim 18, wherein the torque adjusting circuitry is configured to restart the pump in response to the torque falling below the threshold.

20. The control circuitry of the claim 19, wherein the pressure determining circuitry is further configured to determine an initial electrical parameter value of the pump on initializing the pump, the initial electrical parameter value indicative of an initial pressure of the pump, and determine if the initial electrical parameter value exceeds a predetermined initial threshold; and wherein the torque adjusting circuitry is configured to, in response to the initial electrical parameter value exceeding the initial threshold, stop the pump.

* * * * *